(12) United States Patent
Sako et al.

(10) Patent No.: US 6,980,653 B1
(45) Date of Patent: Dec. 27, 2005

(54) SIGNAL REPRODUCING/RECORDING/TRANSMITTING METHOD AND APPARATUS AND SIGNAL RECORD MEDIUM

(75) Inventors: Yoichiro Sako, Chiba (JP); Shigeyuki Yoneyama, Tokyo (JP)

(73) Assignee: Sony Corporation, Tokyo (JP)

( * ) Notice: Subject to any disclaimer, the term of this patent is extended or adjusted under 35 U.S.C. 154(b) by 845 days.

(21) Appl. No.: 09/611,145

(22) Filed: Jul. 6, 2000

Related U.S. Application Data

(63) Continuation-in-part of application No. 08/690,224, filed on Jul. 19, 1996, now Pat. No. 6,108,423.

(30) Foreign Application Priority Data

| Jul. 21, 1995 | (JP) | ................................. 7-185724 |
| Jul. 21, 1995 | (JP) | ................................. 7-185725 |
| May 16, 1996 | (JP) | ................................. 8-121988 |

(51) Int. Cl.[7] .............................................. H04L 9/00
(52) U.S. Cl. ........................ 380/203; 380/210; 380/221
(58) Field of Search ........................................ 380/203

(56) References Cited

U.S. PATENT DOCUMENTS

| 4,631,603 | A | * | 12/1986 | Ryan ............................ 386/9 |
| 4,716,588 | A | * | 12/1987 | Thompson et al. ......... 380/224 |
| 4,907,093 | A | * | 3/1990 | Ryan ............................. 386/94 |
| 5,157,510 | A | * | 10/1992 | Quan et al. .................... 386/94 |
| 5,315,448 | A | * | 5/1994 | Ryan ............................ 360/60 |
| 5,371,792 | A | | 12/1994 | Asai et al. |
| 5,394,470 | A | * | 2/1995 | Buynak et al. ............. 380/204 |
| 5,400,402 | A | | 3/1995 | Garfinkle |
| 5,461,674 | A | | 10/1995 | Citta |
| 5,513,169 | A | | 4/1996 | Fite et al. |
| 5,592,550 | A | | 1/1997 | Davis et al. |
| 5,596,639 | A | | 1/1997 | Kikinis |
| 5,627,655 | A | | 5/1997 | Okamoto et al. |
| 5,675,647 | A | | 10/1997 | Garneau et al. |
| 5,754,648 | A | | 5/1998 | Ryan et al. |
| 5,754,649 | A | | 5/1998 | Ryan et al. |
| RE35,839 | E | | 7/1998 | Asai et al. |
| 5,802,174 | A | | 9/1998 | Sako et al. |
| 5,883,959 | A | * | 3/1999 | Kori ............................ 380/203 |

* cited by examiner

Primary Examiner—Kambiz Zand
(74) Attorney, Agent, or Firm—Frommer Lawrence & Haug LLP; William S. Frommer; Darren M. Simon

(57) ABSTRACT

A system for providing a copy permission indicator in a video signal. The copy permission indicator is generated on the basis of copy management information that has been appended to the video signal and detected by the system. The indicator is in the form of a multiple of coded bits which are arrayed at a pre-set position in the video signal and are operable to indicate a generation limitation on copying of the video signal.

40 Claims, 19 Drawing Sheets

SIGNAL REPRODUCING/RECORDING/TRANSMITTING METHOD AND APPARATUS AND SIGNAL RECORD MEDIUM

CROSS-REFERENCE TO RELATED APPLICATION

This application is a continuation-in-part of U.S. patent application Ser. No. 08/690,224, which was filed on Jul. 19, 1996 U.S. Pat. No. 6,108,423 and which is hereby incorporated by reference.

BACKGROUND OF THE INVENTION

1. Field of the Invention

This invention relates to a signal recording apparatus, a signal record (recording, recordable or recorded) medium and a signal reproducing apparatus for prohibiting copying or unauthorized use.

2. Description of the Related Art

Recently, with increased capacity and coming into widespread use of digital recording media, such as optical discs, prohibition of duplication or unauthorized use thereof has become crucial for protecting the copyright of recorded signals. That is, digital audio data or digital video data can be duplicated by copying or dubbing without deterioration, while computer data can be duplicated to give data which are the same as the original data, thus giving rise to troubles, such as copyright infringement, due to unauthorized copying.

With this in view, a pre-set ID bit for preventing unauthorized copying is occasionally recorded on an original signal record medium for prohibiting unauthorized copying in so-called digital dubbing in which data is reproduced from a digital record medium and re-recorded on another digital record medium.

For example, in a system for prohibiting the unauthorized copying in a digital audio data recording/reproducing apparatus termed a rotary head digital audio tape recorder (R-DAT), an inhibiting code for inhibiting digital copying or generation-serial copying, that is for copying generation limitation (inhibiting code of a standard of the serial copying management system or SCMS) is recorded in a main data area for digital audio signals recorded on a digital audio tape as a signal record medium, so that, when the inhibiting code is detected by the digital audio signal recording apparatus, copying recording of the digital audio signals on a new digital audio tape is inhibited.

Meanwhile, in digital dubbing of video signals, in which digital video signals, for example, recorded on a digital record medium, such as a digital disc or a digital tape, are reproduced and re-recorded on another record medium, a pre-set ID bit, that is the inhibiting code of a standard of the serial copying management system (SCMS), may be recorded in the original digital record medium.

In case of a recording system of recording the pre-set ID bit for prohibiting the unauthorized copying on the original digital record medium, the function of preventing unauthorized copying in the above-described digital dubbing operates satisfactorily. However, in case the digital video signals recorded on an original digital record medium are reproduced and D/A converted for analogically recording the converted analog video signals, or in case the analog video signals are again A/D converted for recording in the digital form, the function of preventing unauthorized copying fails to operates satisfactorily, so that recording can be made directly.

That is, if the digital video signals recorded on the digital record medium is reproduced and D/A converted and the resulting analog video signals are directly recorded analogically or restored by A/D conversion to digital video signals for digital recording, the video signals resulting from dubbing are deteriorated in signal quality to an extremely small extent. This means that copyright protection ia not assured sufficiently, and hence a system is required which positively prohibits such unauthorized copying. In particular, large-capacity disc-shaped recording media have recently become popular, such that a demand has been raised for suitable measures against unauthorized copying of digital video signals recorded on the disc-shaped record medium.

On the other hand, if the pre-set ID bit provided for prohibiting unauthorized copying is skipped in reading, unauthorized copying can be achieved easily. Therefore, suitable measures for prohibiting unauthorized copying by skipping in reading have also been desired.

SUMMARY OF THE INVENTION

It is therefore an object of the present invention to provide a signal reproducing method and apparatus, a signal recording method and apparatus, a signal transmitting method and apparatus and a signal record(recording, recordable or recorded) medium whereby it is possible to prevent unauthorized copying by skipping in reading and it is also possible to inhibit unauthorized copying of analog signal converted from digital data digitally or analogically as well as to inhibit generation-serial copying.

With the method and apparatus for reproducing a signal according to the present invention, digital data or an analog signal D/A converted from the digital data are converted in a pre-set manner based on the recording control information arrayed in a playback mode control signal area and/or each sector header of a signal record medium.

With the method and apparatus for recording a signal according to the present invention, a signal is ciphered using at least a portion of the recording control information designed for controlling the recording on a signal record medium as the key information, or by the key information specified by at least a portion of the recording control information, with this recording control information being arrayed at a pre-set position of a playback mode control signal area of the signal record medium and/or at a pre-set position of each signal recording unit on the signal record medium and being recorded along with the ciphered signal on the signal record medium.

With the method and apparatus for transmitting a signal according to the present invention, digital data or an analog signal D/A converted from the digital data are converted in a pre-set manner based on the recording control information ancillary to transmitted digital data.

With the method and apparatus for transmitting a signal according to the present invention, the signal is ciphered using at least a portion of the transmission management information designed to supervise signal transmission as the key information, or by the key information specified by at least a portion of the recording control information and the transmission management information is transmitted along with the ciphered signal.

With the signal record medium of the present invention, the recording control information for supervising the signal recording on the signal record medium is recorded at a pre-set position in a playback mode control signal area and/or at a pre-set position in each signal recording unit. At least a portion of the recording control information is used as the key information for ciphering the recording signal.

That is, with the present invention, both digital data and the analog signal are converted in a pre-set manner based on the recording control information or the transmission control information. The pre-set conversion may be ciphering or scrambling, for example, for digital data and for analog signals, respectively, whereby both the unauthorized digital copying and unauthorized analog copying may be prohibited from occurring. According to the present invention, since the signal is ciphered based on the recording control information or the transmission control information, deciphering is not feasible if the reading of the recording control information or the transmission control information is skipped, thus enabling prevention of unauthorized copying.

With the video signal reproducing apparatus and method of the present invention, a digital signal is reproduced from a digital disc medium having recorded thereon the video recording control code arrayed in a playback mode control signal recording area provided at a beginning end of a spirally extending recording track and/or in each header of the digital video signal divided into sectors, along with the digital video signal, for ultimately producing at least the analog video signal output. The state of the video recording control code is detected, and the video recording scrambling signal of the mode of the analog video signal and/or the recording inhibiting signal is generated on the basis of the detection output. The video recording scrambling signal and/or the video recording inhibiting signal is annexed in a pre-set area of the vertical blanking period of the analog video output signal converted from the digital video signal and the resulting analog video signal is outputted.

With the video reproducing/recording combination apparatus and method of the present invention, a digital disc medium, having recorded thereon the digital video signal and the video recording control signal, is reproduced for outputting at least the analog video signal, and the output analog video signal is recorded. The video recording scrambling signal of the analog signal mode is generated based on a status detection output of the video recording control code. The generated video recording scrambling signal is annexed in a pre-set area of a vertical blanking period of the analog video signal converted from the digital video signal, and the resulting analog video signal is outputted. Also the input analog video signal, amplitude-adjusted by an automatic amplitude adjustment unit, which is responsive to the video recording scrambling signal contained in the input analog video signal, is recorded on an analog video record medium.

With the video reproducing/recording combination apparatus and method of the present invention, a video recording inhibiting signal of the analog video signal mode is generated on the basis of a state detection output of the video recording control code. The generated video recording inhibiting signal is annexed in a pre-set area of a vertical blanking period of an analog video signal obtained on conversion of the digital video signal, and the resulting analog video signal is outputted. Also the input analog video signal is recorded on an analog video record medium after amplitude adjustment by automatic amplitude adjustment means which responds to the video recording scrambling signal contained in the input analog signal.

With the digital disc medium, designed for coping with the video signal reproducing method of the present invention, a video recording control code, which is a signal functioning for generating the video recording scrambling signal and/or video recording inhibiting signal, is recorded thereon along with the digitized video signal.

That is, according to the present invention, a video recording scrambling signal of the analog signal mode and/or the video recording inhibiting signal is annexed to the analog video signal, D/A converted from the digital video signal read out from the digital disc medium when outputting the analog video signal. The analog video signal, to which is annexed the video recording scrambling signal and/or the video recording inhibiting signal, is analogically or digitally recorded on the record medium. The video signals reproduced from the recorded analog or digital disc medium is scrambled, or inhibited for video recording.

According to the present invention, both the digital data and the analog data are converted in a pre-set manner based on the recording control information and the recording control information. The pre-set conversion includes ciphering for the digital data and scrambling for the analog data. It becomes possible in this manner to inhibit unauthorized analog or digital copying of analog signals temporarily converted from digital data as well as serial generation copying, while it becomes possible to combat unauthorized copying of both the analog and digital data. In addition, since the signal is ciphered based on the recording control information or the transmission control information, deciphering becomes impossible if the recording control information or the transmission control information is skipped in reading, thus enabling inhibition of unauthorized copying.

That is, according to the present invention, if at least the analog video signal is reproduced from the digital disc medium, having recorded thereon the digital video signal and the video recording control signal, arrayed in the playback mode control signal area at the beginning portion of a recording track and/or in each header of the digital video signal divided into sectors, the video recording scrambling signal and/or the video recording inhibiting signal is generated based on the detection output of the state of the video recording control mode and annexed in a pre-set area of a vertical blanking period of an analog video signal, converted from the digital video signal, and the resulting analog video signal is outputted. If the digital disc medium is copied, it is the analog video signal, having annexed thereto the video recording scrambling signal and/or the video recording inhibiting signal, that is analogically or digitally recorded, such that the video signal reproduced from the recorded analog or digital disc medium is a scrambled signal, or cannot inherently be reproduced. Thus it becomes possible with the present invention to inhibit unauthorized analog or digital copying of analog video signals converted from the digital video signals recorded on the digital disc medium, or to inhibit serial generational copying.

DESCRIPTION OF THE PREFERRED EMBODIMENTS

Figure 1:
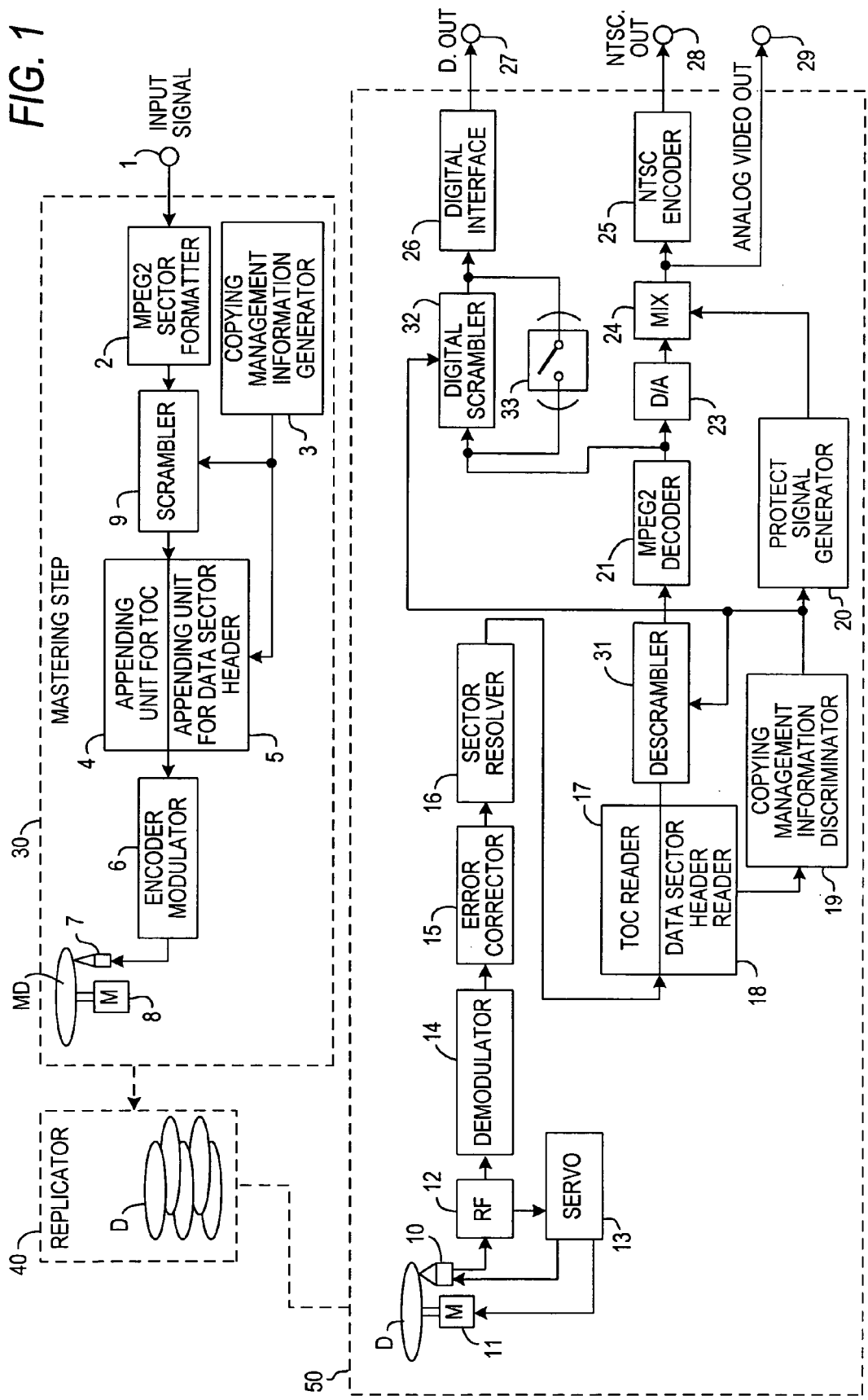
FIG. 1 illustrates a step of manufacturing a master disc and a step of reproducing a duplicated disc.

Referring to the drawings, preferred embodiments of the present invention will be explained in detail.

An optical disc is used as the digital record(recording, recordable or recorded) medium of the present invention, and the process flow until completion of the optical disc is explained by referring to FIG. 1.

First, in a mastering step 30 of fabricating a master disc MD, digital video data converted from a motion picture film, digital data sent directly from a digital camera, or digital video data from a digital VTR for a broadcasting station, are supplied to a terminal 1. The digital video data, for example, supplied via the terminal 1, is sent to a compression encoding circuit 2, where it is encoded in accordance with the so-called MPEG2 standard formulated by the Moving Picture Experts Group (MPEG), at the same time as it is formed into sectors in terms of a pre-set data volume, such as 2048 bytes, as a unit.

The data encoded for compression and formed into sectors by the encoding circuit 2 is sent to a scrambling circuit 9. The scrambling circuit 9 is also supplied with the copy management information for prohibiting unauthorized copying, as later explained, which is generated by a copy management information generating circuit 3. Output data of the encoding circuit 2 is scrambled, as later explained, using the copy management information.

The data scrambled by the scrambling circuit 9 is sent to a copying management information appending circuit. The copying management information generated by the copying management information generating circuit 3 is also supplied to the copying management information appending circuit, where the copying management information is appended to output data of the scrambling circuit 9.

If a recording scrambling signal and/or a recording inhibiting signal in an analog signal format is added to the analog video signal, the scrambling circuit 9 may be omitted, in which case data from the encoding circuit 2 may be directly sent to the copying management information appending circuit.

The copying management information is inserted in one or both of the lead-in area provided at a beginning end of a spirally extending track of an optical disc at the innermost or outermost rim of the optical disc and within the header of the data sector in the program area. In the following description, the copying management information is appended in one or both of the TOC area and the header of the data sector. Thus the copying management information appending circuit has an appendage circuit 4 for appending the copying management information within the TOC and an appendage circuit 5 for appending the copying management information in the data sector header.

The copying management information is made up of one or both of the information specifying the effect that both analog and digital copying or only digital copying inhibition be inhibited, and the information specifying the effect that limitation be placed on the copying generation. In the following, it is assumed that both information be included in the copying management information. It is possible that the charging information be included in the copying management information. By including the charging information in the copying management information, it becomes possible to make only the picture reproduction be charge-free and to permit copying only on payment of a charged fee, that it to inhibit charge-free copying.

Figure 2:
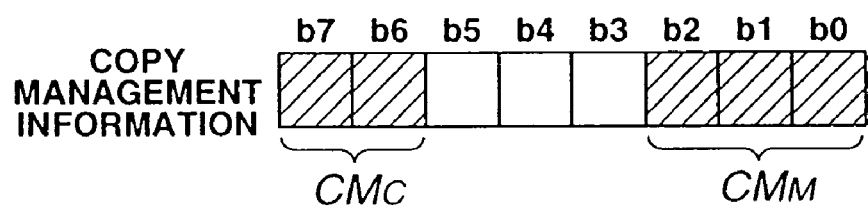
FIG. 2 illustrates the copy management information.

The copying management information for this case may be made up of eight bits b7 to b0 as shown in FIG. 2. Of these eight bits, the upper two bits b7 and b6 are allocated as a bit $CM_C$ instructing generation limitation, while the three lower bits b2, b1 and b0 are allocated as bits $CM_M$ instructing copying inhibition of both digital and analog data or only of digital data. For example, the $CM_M$ bits (b2, b1, b0) of (1, 1, 1) and (0, 1, 1) mean inhibition of both digital and analog copying and inhibition of digital copying, respectively. The bit $CM_C$ allocated to generation limitation in the above copying management information in the fabrication process of the master disc MD specifies that the disc is an original disc.

It may be contemplated to allocate only the bit b2 as a bit $CM_M$ specifying that the copying be inhibited or not inhibited.

In a preferred embodiment, the copy management information takes the form of two bits, each having a different significance, and together identifying various copy permission states. The first bit of the copy management information identifies whether copyright is being asserted:

| | |
|---|---|
| 0: | No copyright exists, or no copy inhibition is being asserted via the copy management information |
| 1: | Copyright exists, and copy inhibition is being asserted via the copy management information |

The second bit of the copy management information identifies whether, in light of the first bit, copying is permitted:

| | |
|---|---|
| 0: | Copying is permitted |
| 1: | If the first bit is "1" then no copying is permitted; and if the first bit is "0" then copying is permitted |

The first and second bits together describe the following conditions:

| | |
|---|---|
| 0, 0: | Copying is permitted without restriction |
| 0, 1: | Copy management information is not being asserted |
| 1, 0: | One generation copying allowed |
| 1, 1: | No copying permitted |

In an illustrative configuration, the preferred two bit copy management information is stored as bits $b_7$ and $b_6$ of the 8 bits of FIG. 2. The two bits may be stored as part of a digital signal. However, the preferred two-bit implementation is not limited to use with digital signals.

In an alternative embodiment, the preferred two bit copy management information is inserted into the vertical blanking interval of an analog signal. Preferably, the two bits are encoded as bits 7 and 8 at word 2 in a 20-bit digital data signal which is, in turn, encoded in line 20 of fields 1 and 2 of the vertical blanking interval of a 525/60 (lines, fields) format analog signal. As an option, the two bits are placed in line 20 or line 21 of field 2 of a 525/60 analog signal. When placed in line 21, the bits make up bits $b_4$ and $b_3$ of an XDS (Extended Data Services) packet. In the case of insertion in line 20 of the vertical blanking interval, a logical "1" is represented by 70% (70-IRE+/−a tolerance) and logical "0" is represented by 0% (0-IRE+/−a tolerance). In the case of insertion in line 21 of the vertical blanking interval, a logical "1" is represented by 50% (50-IRE+/−a tolerance) and logical "0" is represented by 0% (0-IRE+/−a tolerance). Insertion of copy management information into the vertical blanking interval is discussed further in connection with FIGS. 8 and 12 and the protect code signal features of the invention.

The purpose of inserting the copying management information on the sector basis is to array the information in a segmented state in a disc instead of on the overall disc surface in order to cope with different categories of the video signals, that is in order to accommodate the situation in which plural sorts of video signals of different categories are contained in a disc and are not designed to be managed monistically, as in the case of the CD-ROM. The copying management information may also be appended on the block basis instead of on the sector basis.

The data to which the copying management information has been appended by the copying management information appending circuit is sent to an encoder/modulation circuit 6. The encoder/modulation circuit 6 performs data delaying and parity calculations, as error correction encoding operations, on the supplied data, and modulates 8-bit data, for example, on the supplied data to form 16-channel bit modulated data in accordance with a pre-set modulation system. The encoder/modulation circuit 6 also appends synchronization signals of a so-called out-of-rule pattern violating the modulation rule of the above pre-set modulation system every pre-set data amount and sends the resulting data to an optical head unit 7.

The optical head device 7 radiates a laser beam driven based on data supplied from the encoder/modulation circuit 6 to a master disc MD rotated by a rotation servo controlled spindle motor 8 for effecting optical recording. This completes fabrication of a master disc MD having data recorded thereon.

Figure 3:
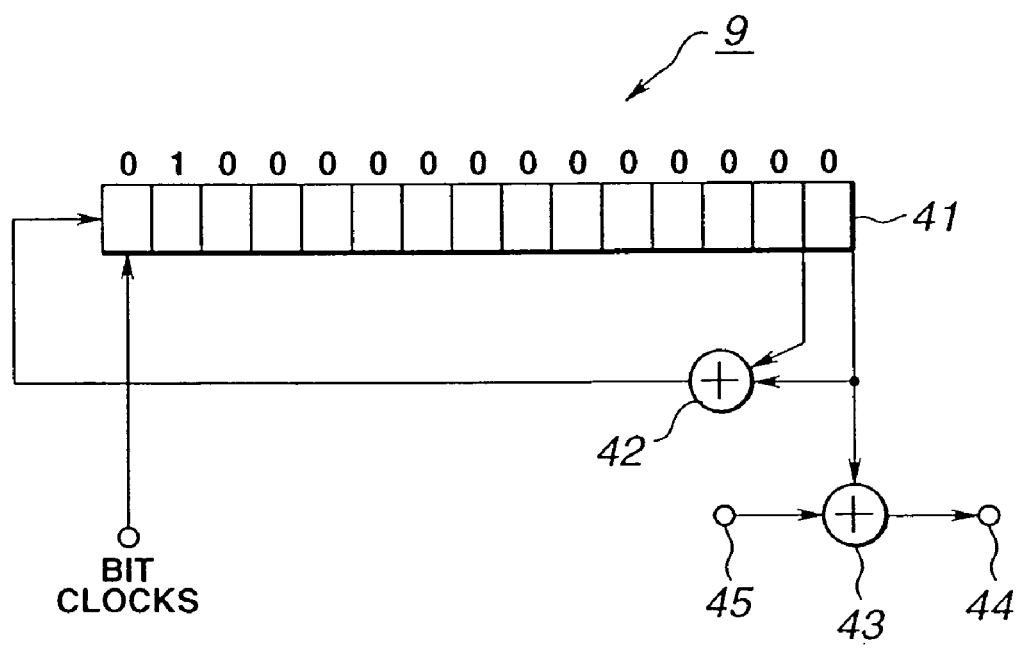
FIG. 3 is a circuit diagram for illustrating a scrambling circuit.
Figure 4:
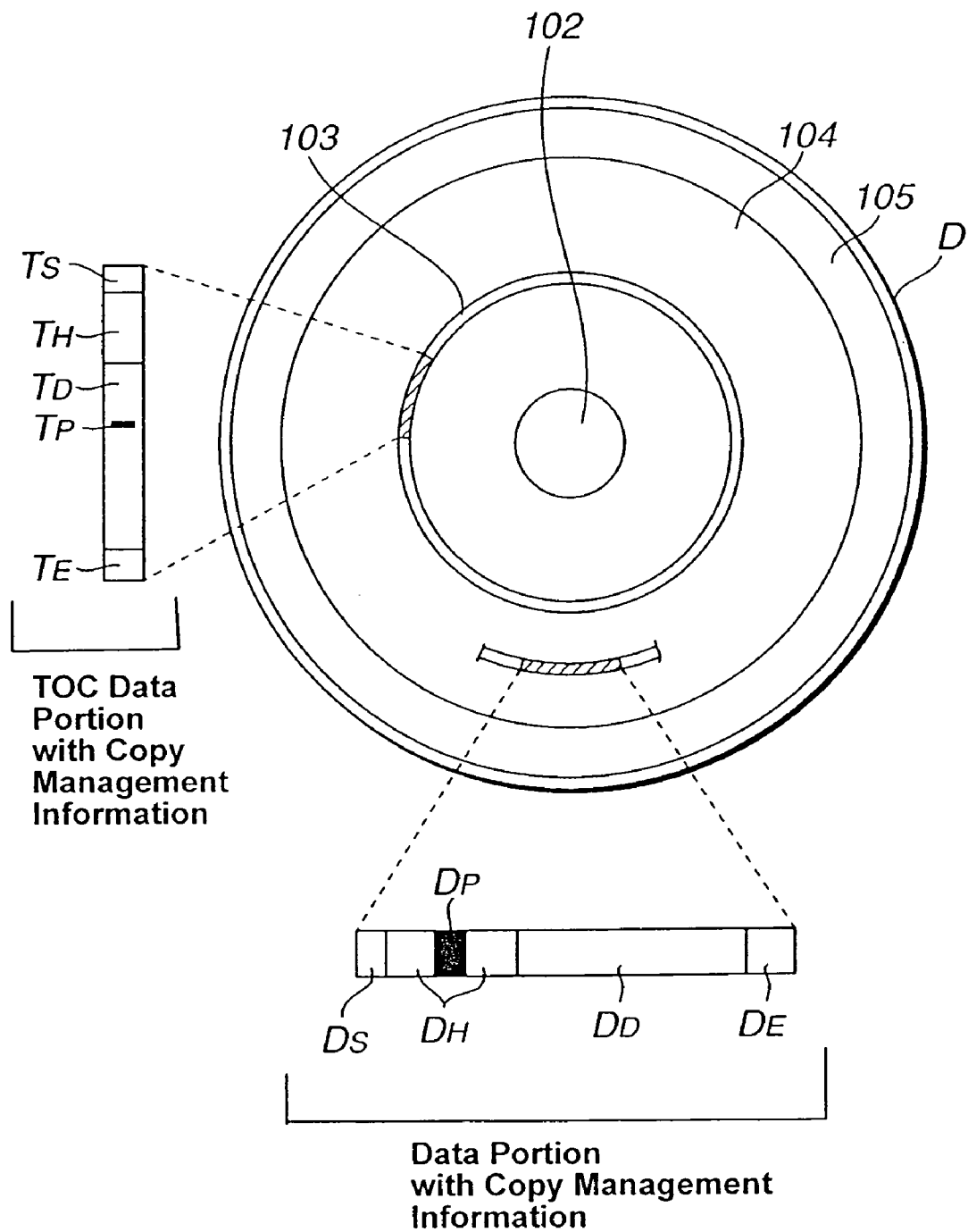
FIG. 4 illustrates the structure of an optical disc.

The scrambling circuit 9 is arranged as shown for example in FIG. 3.

Referring to FIG. 3, a so-called parallel block synchronization type scrambler, employing a 15-bit shift register, may be used as the scrambling circuit 9. To a data input terminal 45 of the scrambler, there is entered data comprised of 2048 byte data of a data portion of FIG. 5 or TOC data portion of FIG. 6, from the compression encoding circuit 2, and 4-byte error detection code (EDC), appended thereto, in a sequence in which the least significant bit (LSB) comes first, that is in an LSB first sequence. The scrambling circuit 14 includes a 15-bit shift register 41 for scrambling for which feedback is applied in accordance with a generating polynominal $x^{15}+x+1$, using an exclusive OR (ExOR) circuit 42. In the 15-bit shift register 41, pre-set values or initial values are variably set in accordance with bits b2, b1, b0 (1,1,1 or 0,1,1) of the bits $CM_M$ of the copying management information as shown in FIG. 2 so that the pre-set values or initial values will be switched on the sector basis. The pre-set values may also be variably set by both the bits $CM_M$ and $CM_C$ instead of being variably set solely by the bit $CM_M$. Output data of the shift register 41 and input data from the terminal 45 are Ex-ORed by the ExOR circuit 43 so as to be taken out as scrambled data at a terminal 44 and thence supplied to the copy management information appending circuit shown in FIG. 1.

In a replication step 40, plural optical discs D are prepared by press working from the master disc MD produced in a manner as described above.

An disc D, duplicated from the master disc MD by the replication step 40, has a center aperture 102. Looking from the inner rim towards the outer rim of the disc-shaped record medium D, there are formed a lead-in area 103, as a program management region or TOC region, a program area 104 having program data recorded therein, and a program end area, or a so-called lead-out area 105. In an optical disc for reproducing audio or video signals, the audio or video signals, encoded for compression as described above, are recorded in the program area 104, while the time information or the like for the audio or video data is managed by the lead-ion area 103. The above-mentioned copying management information is recorded in the TOC sector of the lead-in area 103 and/or in the data sector header in the program area 104.

Figure 5:
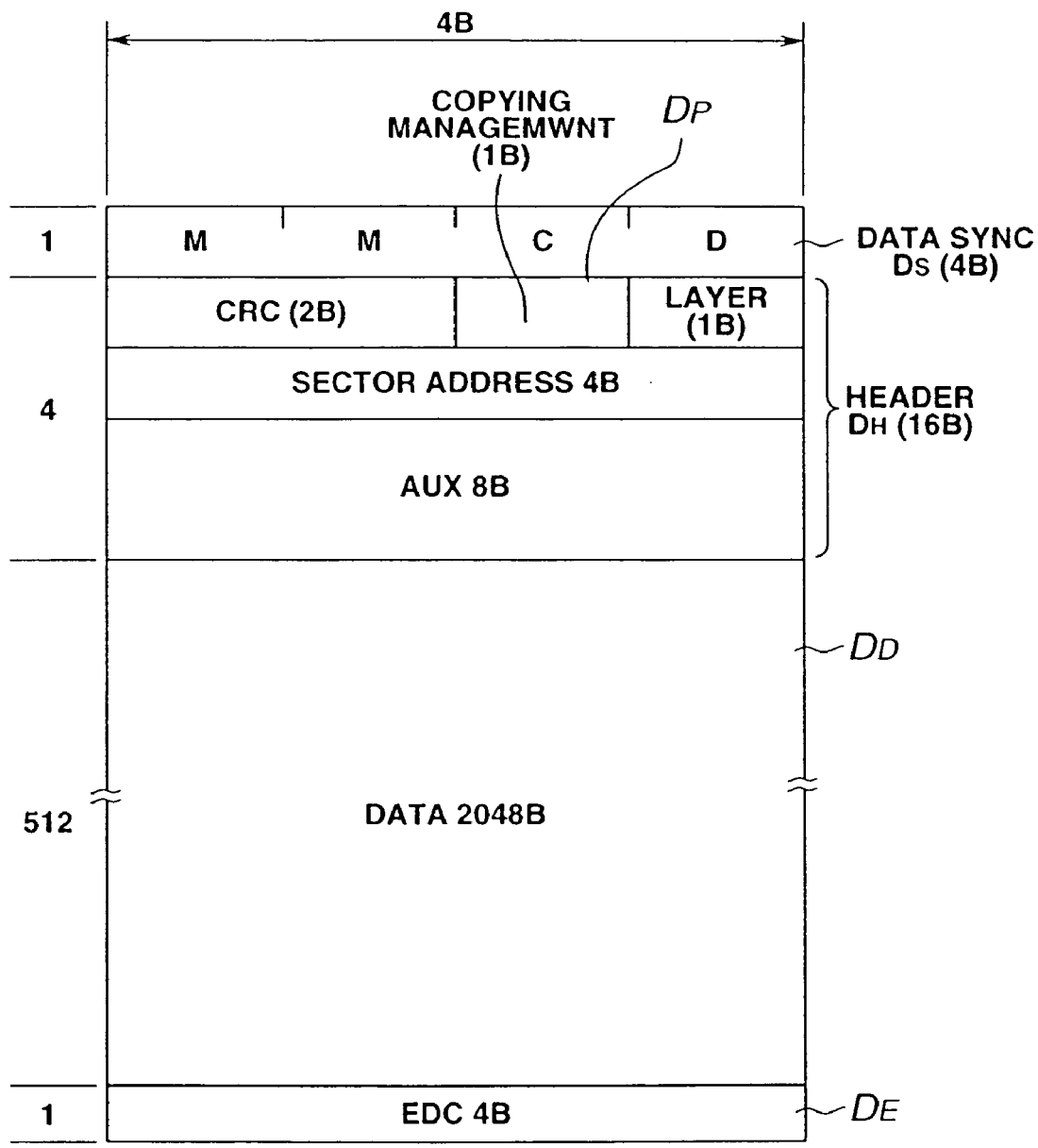
FIG. 5 illustrates the structure of a data sector.

The structure of a data sector in the program area 104 is made up of a 4-byte data sync portion $D_S$, a 16-byte header portion $D_H$, a 2048-byte data portion $D_D$ and a 4-byte error detection code (EDC) portion, with each byte being made up of 8 bits, as shown in FIG. 5. The 1-byte copying management information $T_P$ is arrayed in a TOC data portion $T_D$.

Of course, the copying management information $T_P$ may be provided with the file-based copying management information (paired data comprised of the file position and size and the copying management information) by being combined with the addresses for files. Alternatively, the number of bytes or bits may be increased in order to have the copying management information more specific than the above-mentioned copying management information $D_P$.

The above-mentioned original optical discs D may be reproduced by the user, such as at home.

That is, returning to FIG. 1, a reproducing apparatus 50 for the optical disc D for household use reads out signals (RF signals) by an optical head unit 10 from the optical disc D run in rotation by a spindle motor 10 servo-controlled for rotation by a servo circuit 13. The RF signals read out from the optical disc D by the optical head device 10 are sent to an RF amplifier 12. The RF amplifier 12 converts the RF signals into bi-level signals when taking out signals recorded on the optical disc D and sends the bi-level signals to a demodulating circuit 14. The RF amplifier 12 also separates synchronization signals from the RF signals, while taking out the tracking error signals and the focusing error signals to send the signals to the servo circuit 13. The servo circuit 13 performs rotation control of the spindle motor 11 and the tracking and focusing servo for the optical head unit 10.

The demodulation circuit 14 performs demodulation, which is the reverse of the above-mentioned modulation, for converting 16 channel bit data into 8 bit data. The digital data from the demodulation circuit 14 is sent to an error correction circuit 15 for performing an operation which is the reverse of the above-mentioned error correction encoding. Output digital video data of the error correction circuit 15 is resolved into sectors by a sector resolution circuit 16 and is sent via a copying management information readout circuit as later explained and a descrambling circuit 31 in this order to an expansion decoding circuit 21.

The expansion decoding circuit 21 performs expansion decoding on data encoded for compression in accordance with the above-mentioned rule for MPEG2. The expanded and decoded digital data is converted by a D/A conversion circuit 23 into analog video signals which are sent via a mixing circuit 24 as later explained to an NTSC encoder 25 for conversion into analog video signals of the so-called NTSC system of the standard television broadcasting system. Alternatively, the digital data is outputted via the mixing circuit 24 at an analog output terminal 29 as an analog video signal.

In addition, the digital data from the expansion decoding circuit 21 is sent via a digital scrambling circuit 31 as later explained and a digital interfacing circuit 26 so as to be outputted as digital video data at a digital output terminal 27.

The copying management information readout circuit includes a read-out circuit 18 for reading out the appended copying management information from the header of the data sector and a read-out circuit 17 for reading out the appended copying management information from the TOC data area of the TOC sector, and sends the copying management information read out from the data of the sector resolution circuit 16 to a copying information management circuit 19. If the copying management information is appended to only one of the TOC and the data sector header, only one corresponding circuit of the two read-out circuits 17, 18 is employed.

The copying management information circuit is preferably a majority coincident detection type circuit. More specifically, in its preferred form the copying management information circuit observes the appended copying management information for a multiple of video signal fields before determining the state of the appended information. If the observed state of the appended information is the same for each field of the multiple of observed fields, the appended information is said to be in the state observed. If the observed state of the appended information is different for two or more fields of the multiple of observed fields, no determination of the appended information's state is made and a subsequent multiple of fields is observed. The operation of observing multiple fields is repeated and the appended information state is updated only when the observed state is the same for each field in an observed multiple.

The copying information management circuit 19 judges which of inhibition of analog and digital copy inhibition and inhibition of only of digital copying is specified by the bit $CM_M$ of FIG. 2, and which generation number of the copying inhibition is specified by the bit $CM_C$, and outputs a decision signal responsive to the results of decision. The decision signals are sent to a protect signal generation circuit 20. The copying information management circuit 19 sends the copying management information to the descrambling circuit 31.

The descrambling circuit 31 has a structure similar to that of the scrambling circuit 9 of FIG. 3. In this descrambling circuit 31, pre-set values or initial values, derived from the copying management information from the copying information management circuit 19, are variably set. This allows the descrambling circuit 31 to perform descrambling, that is deciphering, which is a reverse operation of the scrambling operation performed by the scrambling circuit 9. Stated differently, the descrambling circuit 31 cannot perform descrambling if there is no copying management information read out by the copying management information readout circuit from the data sector header or from the TOC data area of the TOC sector and supplied via the copying information management circuit 19. The data descrambled by the descrambling circuit 31 is sent to the expansion decoding circuit 21. Meanwhile, the pre-set value or the initial value of the descrambling circuit 321 can also be set on the basis of the key information specified by the copying management information.

Similarly to the scrambling circuit 9, a digital descrambling circuit 32, fed with digital data from the expansion decoding circuit 21, performs digital descrambling on digital video data from the expansion decoding circuit 21 based on the copying management information. This outputs descrambled digital video data from the digital descrambling circuit 32 at the digital interfacing circuit 26. It is also possible with the digital descrambling circuit 32 to perform descrambling based on the key information specified by the copying management information.

In connection with digital dubbing, in which digital data reproduced from a signal recorded on an optical disc, that is a digital record medium, is recorded as digital data in another digital record medium, there is known a technique of recording a pre-set ID bit, such as that discussed in relation with the prior art, on an optical disc as the copying management information, with a view to prohibiting unauthorized copying. However, unauthorized copying can be easily realized if the copying management information is skipped in reading.

If, in the embodiment of the present invention, the copying management information is skipped in reading the copying management information from the data sector header or TOC data area, with a view to unauthorized copying, the digital data recorded on the optical disc has been scrambled based on the copying management information and hence cannot be descrambled, thus prohibiting such unauthorized copying. In addition, with the embodiment of the present invention, since the digital scrambling is performed by the digital scrambling circuit 32 on the basis of the copying management information, the digital scrambled digital data is copied by digital dubbing. However, the above copying management information is required for descrambling. This again is effective to prohibit unauthorized copying.

In the above-described embodiment, the digital scrambling circuit 32 is provided upstream of the digital interfacing circuit 26. However, a switch 33 may also be provided in place of the scrambling circuit 32. If, in such case, the contents of the copying management information indicate copying prohibition, and the switch 33 is controlled to be turned off, digital video data is not outputted by the digital interfacing circuit 26, thus enabling the prohibition of unauthorized copying in the case of digital copying. If such switch 33 is used, the signal sent from the copying information management circuit 19 to the switch 33 is a switch setting control signal corresponding to the contents of the copying management information.

If, in the digital dubbing, the bit $CM_C$ of the copying management information for copying generation limitation permits copying of the current generation, digital data may directly be outputted without the digital scrambling circuit 32 performing the digital scrambling operation, that is, with the switch 33 being turned on, if such switch 33 is provided. However, in the embodiment of FIG. 2, since the bit $CM_M$ in any case is of a value inhibiting digital copying, the switch 33 is not turned on in the embodiment of FIG. 2.

Figure 7:
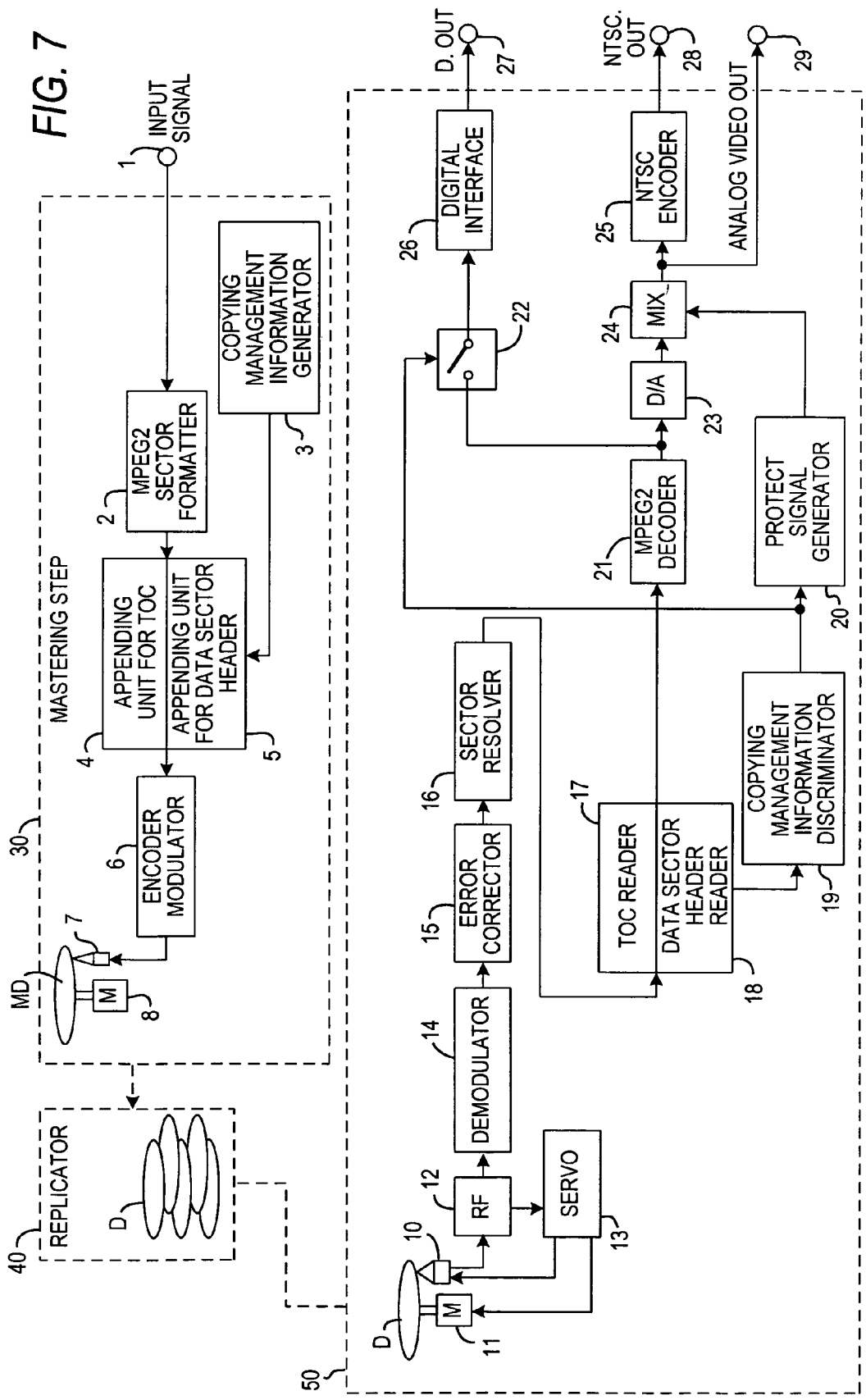
FIG. 7 illustrates another embodiment of a step of manufacturing a master disc and a step of reproducing a duplicated disc.

FIG. 7 shows an embodiment in which the copying is inhibited by the switch 22, without performing scrambling or descrambling such as one described above.

In the embodiment of FIG. 7, data compressed in volume and formed into sectors by the compression encoding circuit 2 in the mastering step 30 is directly sent to a copying management information appendage circuit, that is an appendage circuit 4 for appending the copying management information in a TOC and an appendage circuit 5 for appending the copying management information in the data sector header. In the reproducing device 50, digital video data resolved into sectors by the sector resolution circuit 16 is directly sent to the expansion decoding circuit 21 via a copying management information readout circuit, that is read-out circuits 17 and 18 for reading out the copying management information from the TOC data area and the data sector header, respectively. The digital data from the expansion decoding circuit 21 is sent via the switch 22 to the digital interfacing circuit 26. A decision signal from the copying information management circuit 19 is sent to the protect signal generating circuit 20, while being sent as a switching control signal to the switch 22. The present embodiment is otherwise similar in structure to the embodiment of FIG. 1, so that corresponding portions are denoted by the same reference numerals and the corresponding description is not made for clarity.

If, in the embodiment of FIG. 7, the above result of decision indicates copying inhibition, the switch 22 is turned off by a switching control signal corresponding to the result of decision. Meanwhile, if the generation limitation bit $CM_C$ of the copying management information specifies that the disc is not an original disc and is of a generation specifying copying inhibition, a switching control signal which turns off the switch 22 is outputted by the copying information management circuit 19.

This inhibits outputting of digital video data from the digital interfacing circuit 26, so that it becomes possible to prohibit unauthorized copying in digital dubbing in which digital data reproduced from a signal recorded on an optical disc D (digital disc medium) is directly recorded as digital data on a separate digital disc medium.

With the embodiment of the present invention, in case of digital or analog copying by the intermediary of an analog interface, in which digital video data recorded on an original digital record medium is reproduced and D/A converted into analog video signals, these D/A converted analog signals are transmitted via an analog interface having an analog output or an analog input terminal, and the analog video signals are subsequently again A/D converted to digital video signals for digital recording, or the analog video signals are directly analogically recorded, unauthorized copying may be prohibited by generating a protect signal as explained later by referring to FIGS. 8, 10 and 12 by the protect signal generating circuit 20 and by mixing the protect signal in the analog video signals by the mixing circuit 24.

Figure 8:
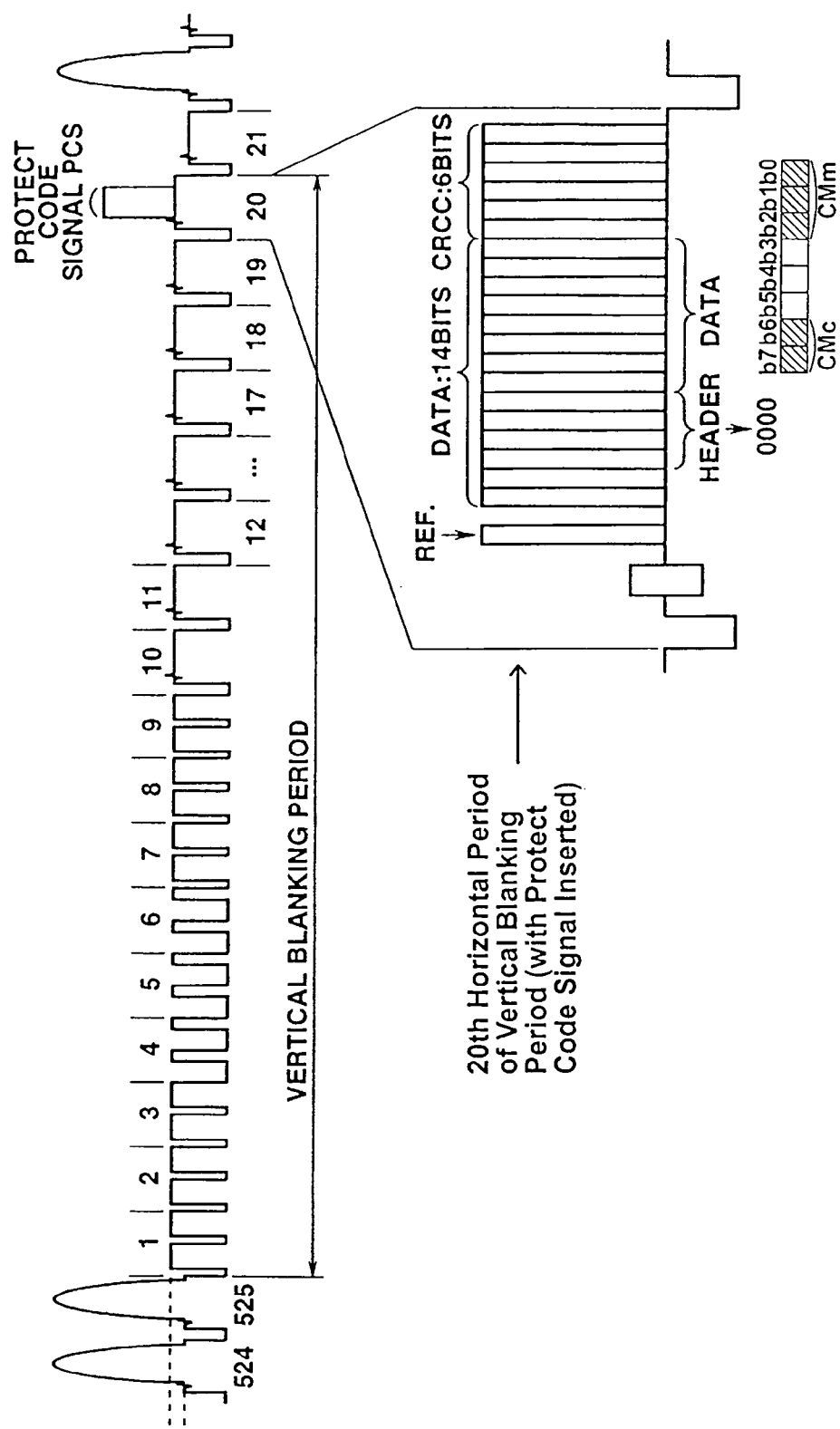
FIG. 8 is a waveform diagram showing the state in which a protection code signal has been appended to an analog video signal.
Figure 9:
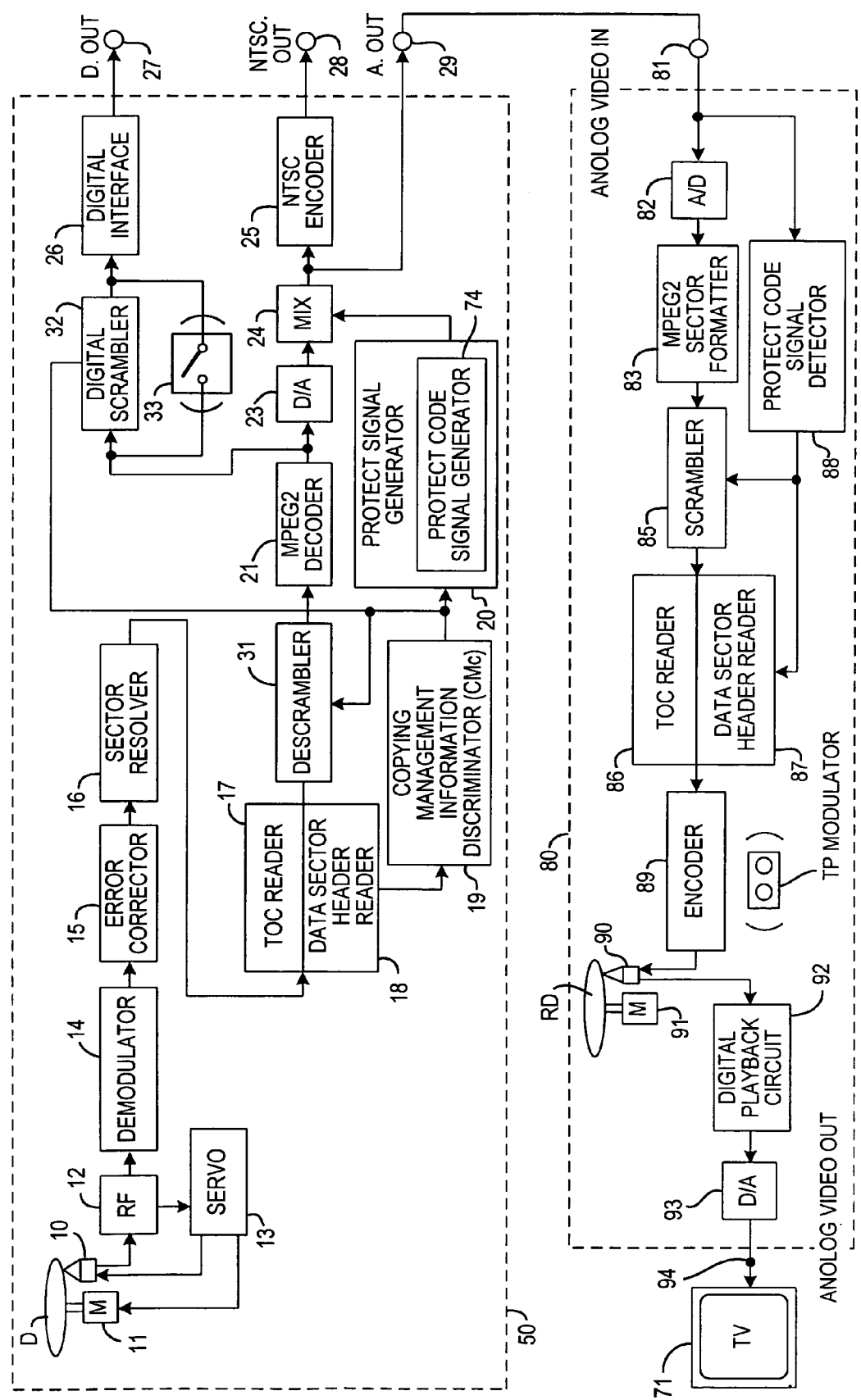
FIG. 9 is a block circuit diagram showing the structure of an arrangement for prohibiting unauthorized copying in which digital video signals are converted into analog video signals which are again converted into analog video data for copying.

Referring first to FIGS. 8 and 9, inhibition of unauthorized copying is explained in connection with a case in which digital vide data recorded on a digital record medium is reproduced and once D/A converted into analog video signals, these analog video signals being again A/D converted by the intermediary of an analog interface to digital video signals, which are recorded as digital data.

In the following description, it is assumed that the generation limitation bit $CM_C$ of the copying management information allows only for one-generation copying, that is, it does not permit reproduction of copied data as from the second and following generations, as counted from the original.

In the reproducing apparatus 50 for an optical disc D shown in FIG. 9, the copying information management circuit 19 decides whether the bit $CM_M$ of the copying management information specifies inhibition copying of both analog and digital data or only digital data, and also which generation the bit $CM_C$ specifies as copying generation limitation. A decision signal corresponding to the result of decision is sent to the protect signal generation circuit 20.

If the bit $CM_M$ of the copying management information does not specify inhibition of analog copying, and the generation limitation bit $CM_C$ specifies that the disc is an original disc, a protect code signal generating circuit 74 within the protect signal generation circuit 20 generates and outputs a protect code signal PCS specifying that effect by plural coded bits.

This protect code signal PCS is sent to the mixing circuit 24 which then mixes the protect code signal PCS in a pre-set horizontal period within a vertical blanking period of an analog video signal, as shown in FIG. 8. Meanwhile, the protect code signal PCS is inserted at the 20Hth horizontal period and at the 283Hth horizontal period, where H denotes horizontal period, for an odd field and for an even field, respectively. The protect code signal PCS, mixed into the analog video signal, is made up of, for example, 14-bit data and 6-bit error detection correction code (CRCC), wherein the 8 bits following the 4-bit header in the 14-bit data are allocated in the similar manner to the copying management information described previously. The analog video signal, having the analog protect code signal appended thereto, is outputted at an analog output terminal 29.

The analog output terminal 29 of the reproducing apparatus 50 is connected to an analog input terminal 81 of an optical disc recording/reproducing apparatus 80, employing a recordable optical disc RD as a record medium, as an example of a video signal reproducing apparatus. The analog video signal with the appended protect code signal, outputted by the output terminal 29 of the reproducing apparatus, is A/D converted by the disc recording/reproducing apparatus 80 into digital video data which is digitally recorded on the optical disc DD. That is, the recording for this case is the first generation copying from an original disc.

With the optical disc recording/reproducing apparatus 80, the analog video signals supplied via the analog input terminal 81 is converted by an A/D conversion circuit 82 into digital video data which is sent to a compression encoding circuit 83, where it is encoded for compression according to the MPEG2 standard and formed into sectors in terms of 2048 bytes as a unit. The data encoded for compression in the compression encoding circuit 83 and formed into sectors is sent to a scrambling circuit 85.

The analog video signal, to which the protect code has been appended and which has been supplied to the analog input terminal 81, is also sent to a protect code signal detection circuit 88. The protect code signal detection circuit 88 detects the possible presence of the protect code signal appended to the vertical blanking period of the analog video signal as shown in FIG. 8 and the state of the protect code signal and newly generates the copying management information based on the detected protect code signal. The protect code signal supplied at this time to the protect code signal detection circuit 88 specifies that the disc is copied from the original disc and is permitted for the first generation copying as counted from the original disc.

Thus the protect code signal detection circuit 88 modifies the generation limitation bit $CM_C$ of the copying management information to a value specifying that the disc is a first generation copy as counted from the original disc, and outputs the modified value.

The copying management information from the protect code signal detection circuit 88 is sent to the scrambling circuit 85 and to the copying management information appendage circuit.

Similarly to the scrambling circuit 9 of FIG. 1, the scrambling circuit 85 scrambles output data of the compression encoding circuit 83 based on the copying management information from the protect code signal detection circuit 88. The scrambled data from the scrambling circuit 85 is sent to the copying management information appendage circuit. Meanwhile, a ciphering circuit may be used in place of the scrambling circuit 85. The copying management information appendage circuit has an appendage circuit 86 for appending the copying management information into the TOC and an appendage circuit 87 for appending the copying management information into the data sector header, as explained previously. The scrambled data, having the copying management information appended thereto as previously explained by the copying management information appendage circuit, is sent to an encoder/modulation circuit 89.

The encoder/modulation circuit 89 performs data delaying and parity calculation operations on the supplied data for appending parity data and converts the resulting data in accordance with a pre-set modulation system from, for example, 8-bit data into 16 channel bit modulated data. The encoder/modulation circuit 89 appends synchronization signals of a so-called out-of-rule pattern violating the modulation rule of the pre-set modulation system, in terms of a pre-set data amount as a unit, and sends the resulting data to an optical head device 90.

The optical head device 90 effects optical recording by radiating a laser beam excited based on data supplied from the encoder/modulation circuit 89 to the recordable optical disc RD run in rotation by a rotation servo controlled spindle motor 91. For recording on the optical disc RD, so-called magneto-optical recording may be used, in which case a magnetic head is provided facing the optical head device 90 with the optical disc RD in-between and the laser beam of a power high enough to heat a magnetic film formed on the optical disc RD to a temperature higher than the Curie temperature ia radiated on the optical disc RD, while the magnetic head is driven based on the signal from the encoder/modulation circuit 89. In this manner, digital video data, corresponding to the digital video data from the original disc processed through the analog interface, is copied on the optical disc RD.

Next, if the optical disc RD, to which digital video data has been copied from the original disc, is reproduced and D/A converted into analog video signals, which are again converted by A/D conversion to digital video data, which in turn is recorded on a separate recordable optical disc RD, by way of performing the second-generation copying, the following measures are used to render data reproduction from the optical disc RD infeasible even if such second generation copying is performed. That is, if the disc RD, on which the first generation copying has been performed, is again loaded on the reproducing apparatus 50 of FIG. 9 for reproduction, and the analog video signal resulting from the reproduction is again copied by the optical disc recording/reproducing apparatus 80 shown in FIG. 9, the following measures are used.

That is, data read out from the optical disc RD by the reproducing apparatus 50 from the optical disc RD to which the first generation copying has been done as described above, is sent to the copying management information readout circuits 17, 18, in the same way as explained previously. The copying management information taken out from the readout circuits 17, 18 is sent to the copying management information decision circuit 19.

A decision signal from the copying management information decision circuit 19 is sent to the protect signal generation circuit 20 from which the protect code signal PCS is generated and outputted to the mixing circuit 24. The mixing circuit 24 is fed with an analog video signal descrambled by the descrambling circuit 31, processed by the expansion decoding circuit 21 and D/A converted by the D/A conversion circuit 23. The protect code signal PCS is mixed by the mixing circuit 24 with the analog video signal and the resulting signal is outputted at the analog output terminal 29.

The analog output terminal 29 of the reproducing apparatus 29 is connected to the analog input terminal 81 of the optical disc recording/reproducing apparatus 80, such that the analog video signal having the program code signal appended thereto, outputted at the analog output terminal 9 of the reproducing apparatus 50, is supplied to the analog input terminal 81 of the disc recording/reproducing apparatus 80.

The disc recording/reproducing apparatus 80 converts the analog video signals supplied via analog input terminal 81 into digital video data by the A/D conversion circuit 82, and the compression encoding circuit 83 then performs compression encoding and formation into sectors on the resulting digital video data. The resulting data is sent to the scrambling circuit 85.

The analog video signal supplied to the analog input terminal 81, having the protect code signal appended thereto, is also sent to the protect code signal detection circuit 88.

The protect code signal, supplied at this time to the protect code signal detection circuit 88, specifies that the optical disc is the first generation copy disc. The protect code signal detection circuit 88 converts the generation limitation bit $CM_c$ of the copying management information to a value specifying that the disc is the second generation disc from the original disc, and outputs the resulting modified value.

The copying management information from the protect code signal detection circuit 88 is sent to the scrambling circuit 85 and to the copying management information appendage circuit. The scrambling circuit 85 scrambles output data of the compression encoding circuit 83 based on the copying management information from the protect code signal detection circuit 88, in a manner as explained previously. The copying management information appendage circuit appends the copying management information to scrambled data from the scrambling circuit 85 and outputs the resulting data.

If a ciphering circuit is used in place of the scrambling circuit 85, the protect code signal detection circuit 88 outputs a control signal for enabling ciphering by the ciphering circuit. The control signal may be the key information for ciphering. This outputs the ciphered digital video signal from the ciphering circuit.

Output data of the copying management information appendage circuit is corrected for errors and modulated by the encoder/modulation circuit 89 and thence supplied to an optical heads device 90 or a magnetic head for optical or magneto-optical recording in a manner as explained previously.

The optical disc RD, on which the second generation copying has been done as described above, is read out by the optical head device 90 of the optical disc recording/reproducing apparatus 80. The read-out data is sent to the reproducing system of the optical disc recording/reproducing apparatus 80.

A digital reproducing circuit 92 of the reproducing system has, in addition to main components, such as an RF circuit 12, demodulation circuit 14, an error correction circuit 15, a sector resolution circuit 16 and an expansion/decoding circuit 21, the above-mentioned copying management information readout circuit, copying management information decision circuit 19 and the descrambling circuit 31.

The copying management information decision circuit of the digital reproducing circuit 92 discriminates the generation limitation bit $CM_C$ of the copying management information read out from the optical disc RD and thus learns that the optical disc RD is a second generation copy disc. At this time, the copying management information decision circuit 19 of the digital reproducing circuit 92 is designed not to output the copying management information to the descrambling circuit 31, or to output the non-scramblable copying management information.

Thus the data sent to the expansion decoding circuit 21 in the digital reproducing circuit 92 is the non-descrambled data, so that, if the data is expanded and decoded by the expansion decoding circuit 21, regular digital video data cannot be produced.

With the above-described arrangement, in such a case wherein digital video data recorded on the original digital record medium is reproduced and temporarily D/A converted into analog video signals, which are again A/D converted into digital video data for digital recording, generation limitation becomes possible to prevent unauthorized copying. In the above case, the second generation data copying can be done on the optical disc RD. However, since the recorded data is not descrambled data, regular pictures cannot be obtained if the data is reproduced and displayed on a television receiver 71, thus prohibiting unauthorized copying.

If, in the case of digital copying via the analog interface, the copying management information is skipped in reading during reproduction of the optical disc RD by the reproducing apparatus 50 with a view to unauthorized copying as described above, since the digital data recorded on the optical disc RD is scrambled on the basis of the copying management information, the descrambling circuit 31 cannot descramble the data, while a protect code generation circuit 74 cannot generate the protect code signal based on the copying management information, thus enabling prohibition of unauthorized copying. That is, since the optical disc recording/reproducing apparatus 80 cannot generate the copying management information based on the protect code signal, the scrambling circuit 85 cannot descramble data, thus enabling prevention of unauthorized copying. It may be envisaged to mask the protect code signal instead of skipping the reading of the copying management information with a view to unauthorized copying. In this case, the scrambling circuit 85 of the optical disc recording/reproducing apparatus 80 cannot descramble the data, thus assuring prevention of unauthorized copying.

In the above example, the first generation copying from the original disc is permitted. However, if the generation limitation bit $CM_C$ of the copying management information is selected for inhibiting the first generation copying, the first generation copying from the original disc is prohibited.

Also, in the above example, an optical disc RD recordable on the recording/reproducing apparatus 80 is used. Of course, similar prevention of copying can be achieved with a digital video data recording/reproducing apparatus for a video tape TP.

With the above example, the digital video data recorded on the original digital record medium is reproduced and temporarily converted into analog video signals which are again A/D converted into digital video signals for digital recording. However, unauthorized copying can be prohibited if an analog video signal is recorded as it is analogically.

Figure 10:
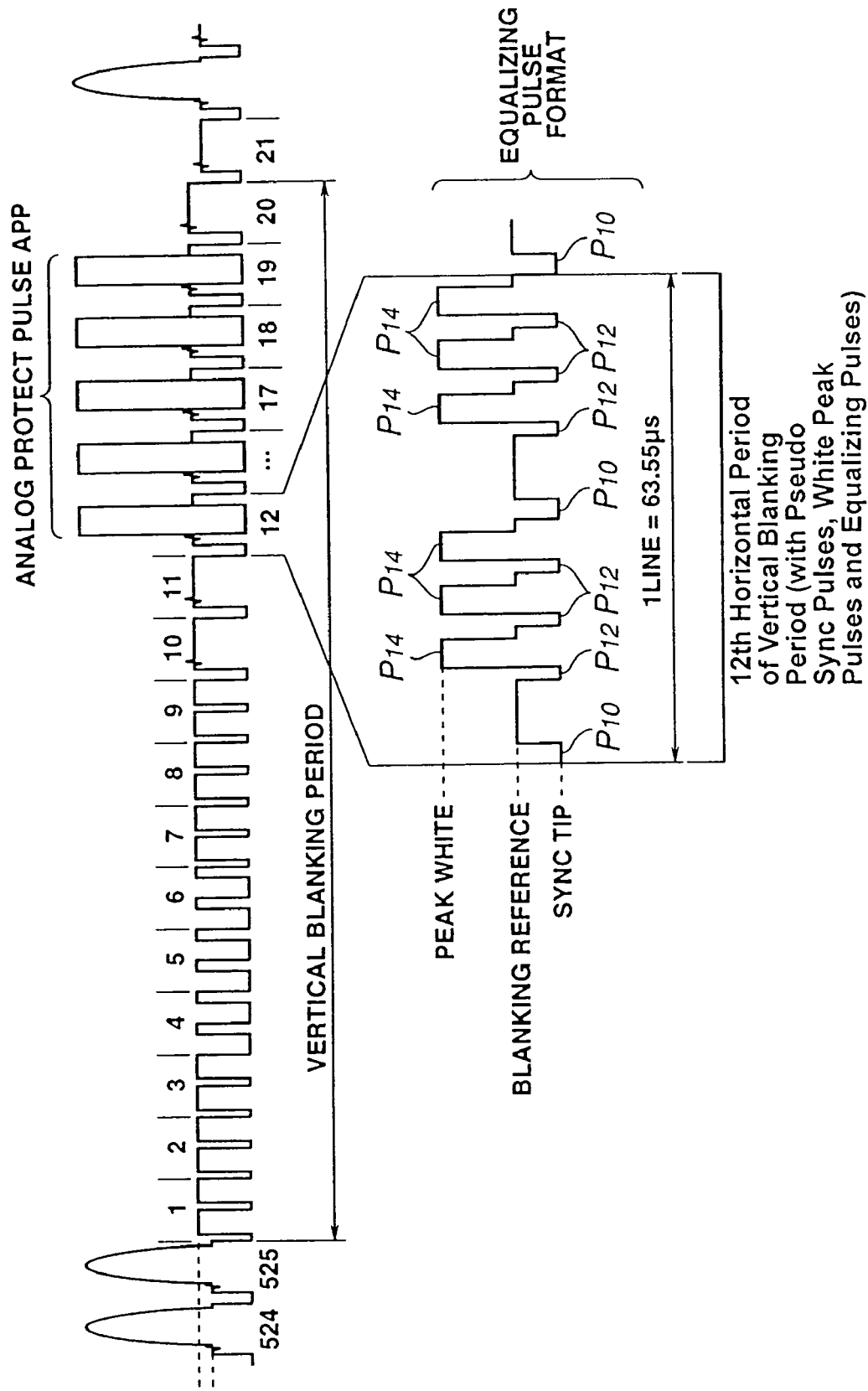
FIG. 10 is a waveform diagram showing the state in which an analog protection code signal has been appended to an analog video signal.
Figure 11:
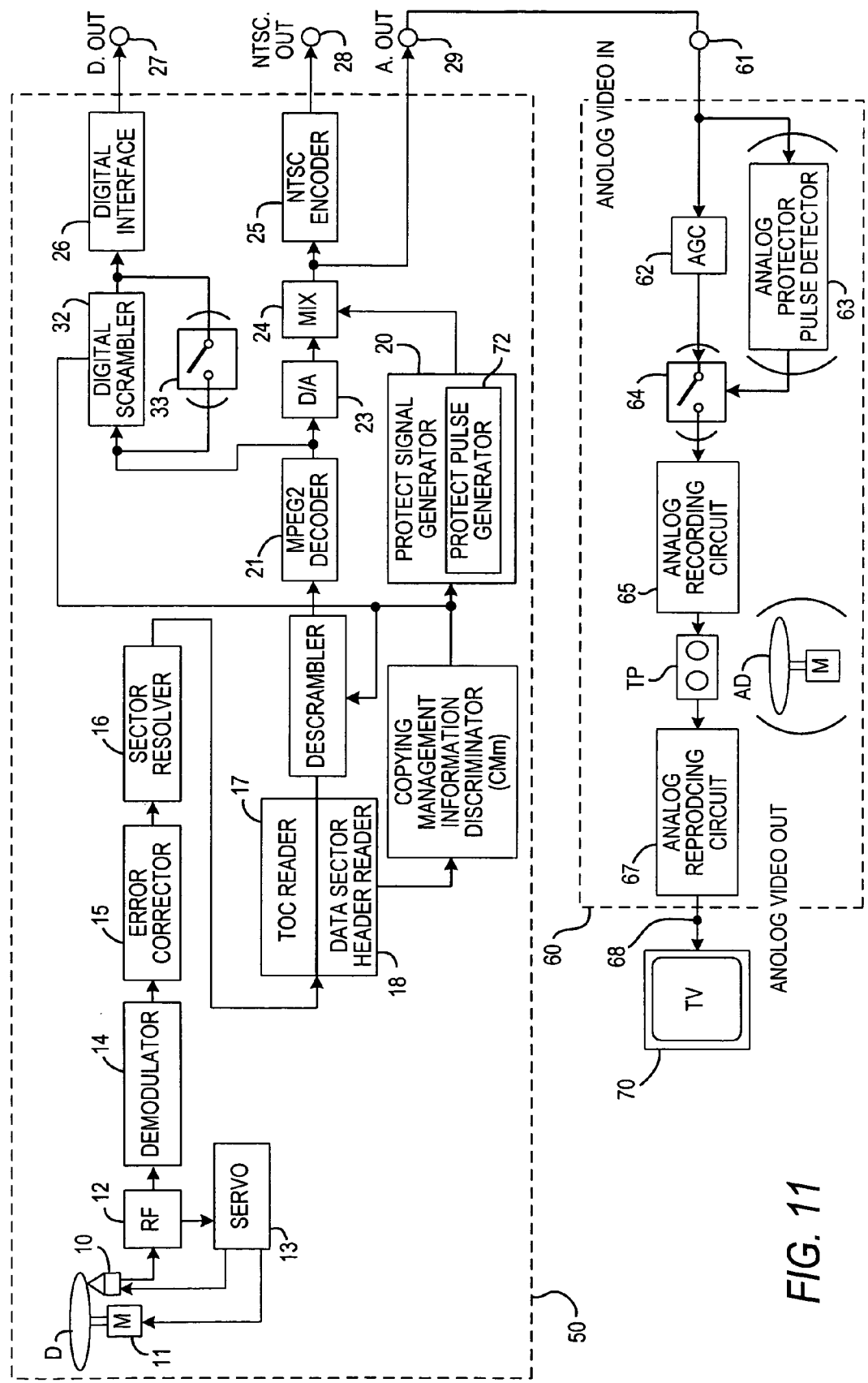
FIG. 11 is a block circuit diagram showing the structure of an arrangement for prohibiting unauthorized copying in which digital video signals are converted into analog video signals which are again converted into an log video data for analog copying.

Referring to FIGS. 10 and 11, prevention of unauthorized copying is explained for a case in which digital video data recorded on an original digital record medium is reproduced and transiently D/A converted into analog video signals which are then analogically recorded on a conventional analog video tape recorder (analog VTR).

It is assumed in such case that, with the reproducing apparatus 50 for the optical disc D shown in FIG. 11, the bit $CM_M$ of the copying management information indicates inhibition of copying, and the decision signal from the decision circuit 19 indicates inhibition of analogical copying. It is also assumed that an analog protect pulse APP, which is a white peak signal, is generated by a protect pulse generating circuit 72 in the protect signal generating circuit 20. This analog protect pulse APP is mixed by the mixing circuit 24 in a pre-set period of the vertical blanking period of the analog video signal, as shown in FIG. 11. The protect pulse generating circuit 72 also generates the analog protect pulse APP if the copying management information is not supplied. A decision signal corresponding to the inhibition of analog copying is outputted by the copying management information decision circuit 19 even if the generation limitation bit $CM_C$ denoted by the copying management information specifies inhibition of analog copying of the current generation. The system of inhibiting analog copying is termed the analog protection system (APC).

An output signal of the mixing circuit 24 is such a signal in which plural pairs of positive pulses and pseudo synchronization pulses of a pre-set sequence are appended to the video signal in the vertical blanking period of the analog video signal next to the synchronization pulse. In the illustrative case of FIG. 10, plural pulse pairs of a pseudo synchronization pulse $P_{12}$ and a positive pulse, such as a white peak pulse, are inserted next to two equalizing pulses $P_{10}$ in a horizontal line (horizontal period). The technique of using a combination signal of these plural pseudo synchronization pulses and plural white peak signals as a recording scrambling signal is disclosed in JP Patent Kokai Publication JP´-A-61-288582 (1986). The analog protection system (APS) employing this pseudo-sync pulse (PSP) is termed the PSP system.

The reason the normal picture recording becomes impossible on a usual video tape recorder (VTR) is now briefly explained.

It is assumed that the analog output terminal 29 of the reproducing apparatus 50 is connected to the analog input terminal 61 of the analog VTR 60, and the analog video signals, having appended thereto the above recording scrambling signal outputted by the analog output terminal 29 of the reproducing apparatus 50, are recorded on the video tape TP by an analog VTR 60.

Usually, the analog VTR 60 has an automatic gain control (AGC) circuit 62, as automatic amplitude adjustment means or automatic gain adjustment means, and is configured for automatically adjusting the amplitude of the analog video signal entering the analog input terminal 61. If the analog video signal shown in FIG. 10 is supplied to the analog VTR 60 provided with such AGC circuit 62, the AGC circuit 62 responds to the white peak signal added in the vertical blanking period, thus narrowing the inherent video signal amplitude. That is, the AGC circuit 62 of a usual video tape recorder cannot distinguish the equalizing pulse $P_{10}$ from the pseudo synchronization pulse $P_{12}$ and hence samples the level of the appended positive pulse $P_{14}$ such that it recognizes the positive pulse level as being several times as large in amplitude as the input signal level and manages control to lower the gain. If the analog video signal, automatically adjusted in amplitude by the AGC circuit 62, is recorded via the analog recording circuit 65 on the video tape TP, and subsequently reproduced by an analog reproducing circuit 67 in the television receiver 70 via an analog output terminal 68, an extremely ill-looking picture is produced due to unusual lightness level in the reproduced picture.

In this manner, inhibition of unauthorized copying, inclusive of generation limitation, becomes possible for a case in which digital video data recorded on an original digital record medium is reproduced and transiently D/A converted into analog video signals which are then analogically recorded on a conventional analog VTR.

If, in such analog copying via analog interface, the copying management information is skipped in reading during reproduction of the optical disc RD in the reproducing apparatus 50 with a view to unauthorized copying in a manner as described above, the digital data recorded on the optical disc RD is scrambled based on the copying management information, and hence cannot be descrambled by the descrambling circuit 31. In addition, the protect code generating circuit 74 is designed to generate the protect pulse even if the copying management information is not supplied, thus enabling unauthorized copying.

In the example of the analog VTR 60 of FIG. 11, the reaction of the AGC circuit 62 to the analog protect pulse APP is utilized. However, if a detection circuit 63 for detecting the analog protect pulse APP from the analog video signal supplied via analog input terminal 61 to the analog VTR 60 is provided, a switch 64 is provided, such as downstream of the AGC circuit 62, and the switch 64 is turned off on detection of the analog protect pulse APP, it becomes possible to inhibit unauthorized copying. That is, if the switch 64 is turned off, the analog video signal supplied to the analog input terminal 61 cannot be recorded on the video tape TP, it becomes possible to inhibit unauthorized copying.

In the above embodiment, description has been made on an analog VTR employing a video tape TP. It should however be noted that the above-described technique for copying inhibition can be utilized for an analog video disc recording/reproducing apparatus employing an analog video disc AD.

Figure 12:
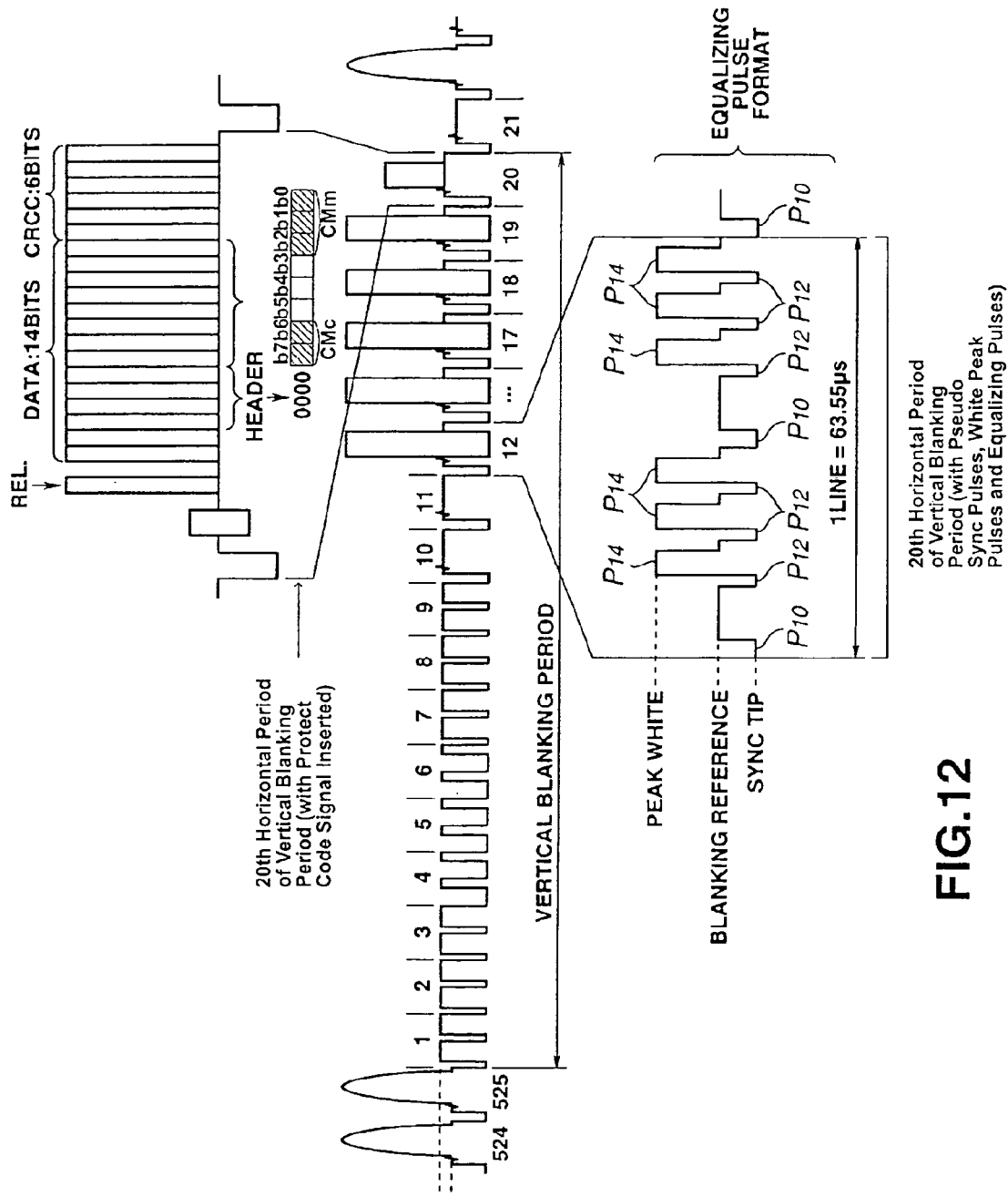
FIG. 12 is a waveform diagram showing the state in which an analog protection code signal and a protect code signal have been appended to an analog video signal.
Figure 13:
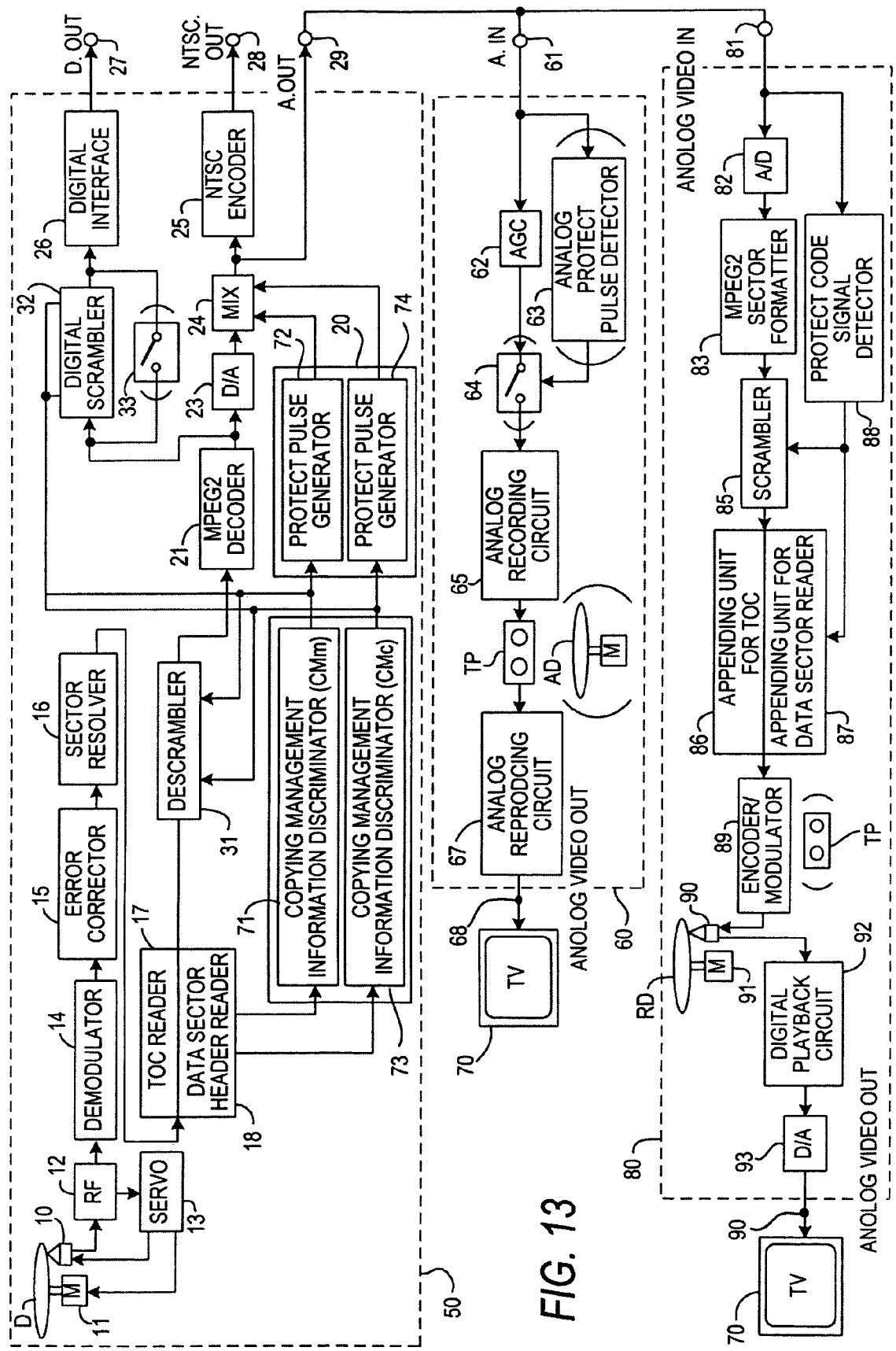
FIG. 13 is a block circuit diagram showing the structure of an arrangement for prohibiting unauthorized copying in which digital video signals are converted into analog video signals which are analogically and digitally copied.

In addition, according to the present invention, unauthorized copying can be inhibited both for a case in which the analog video signals are again A/D converted, transmitted via an analog interface and subsequently restored to digital video data which is digitally recorded, and for a case in which the analog video signals are transmitted via analog interface and directly recorded analogically, as shown in FIGS. 12 and 13.

Specifically, the copying management information decision circuit 19 in the reproducing apparatus 50 for the optical disc D includes a decision circuit 71 for discriminating the state of the bit $CM_M$ of the copying management information, and a decision circuit 73 for discriminating the bit $CM_C$ of the copying management information. The decision signals from the decision circuits 71, 73 are sent to the protect signal generating circuit 20, while the copying management information is sent to the descrambling circuit 31 and to the digital scrambling circuit 32.

The descrambling circuit 31 and the digital scrambling circuit 32 perform the operations similar to those explained previously.

The protect signal generating circuit 20 includes a protect pulse generating circuit 72 for generating the analog protect pulse APP based on the decision signal from the decision circuit 71, and a protect code signal generating circuit 74 for generating the protect code signal PCS based on the decision signal from the decision circuit 71. The analog protect pulse APP from the protect pulse generating circuit 72 and the protect code signal PCS from the protect code signal generating circuit 74 are sent to the mixing circuit 24.

Thus the mixing circuit 24 outputs a signal corresponding to an analog video signal in a pre-set period in the vertical blanking period of which the above protect code signal PCS is mixed and on plural pseudo synchronization pulses (pseudo equivalent pulses) of which plural white peak signal are combined, as shown in FIG. 12.

The above signal, that is the analog video signal having the protect code signals PCS and the analog protect pulses APC appended thereto, is outputted at the analog output terminal 29.

The analog output terminal 29 of the reproducing device 50 is connected to the analog input terminal 81 of the optical disc recording/reproducing apparatus 80 and to the analog input terminal 61 of the analog VTR 60. The analog VTR 60 analogically records the analog video signals on the video tape TP, while the optical disc recording/reproducing apparatus 80 converts the analog video signals into digital video signals which are recorded on the optical disc RD. The recording/reproducing operation by the analog VTR 60 and the optical disc recording/reproducing apparatus 80 is similar to that described above and hence is not explained in detail. It is noted that the optical disc recording/reproducing apparatus 80 detects not only the protect code signal PCS but also the analog protect pulse APP in the protect code detection circuit 88 and, on detection of the analog protect pulse APP, performs scrambling by the scrambling circuit 85, for prohibiting unauthorized copying.

A modified embodiment of the present invention will now be explained.

Figure 6:
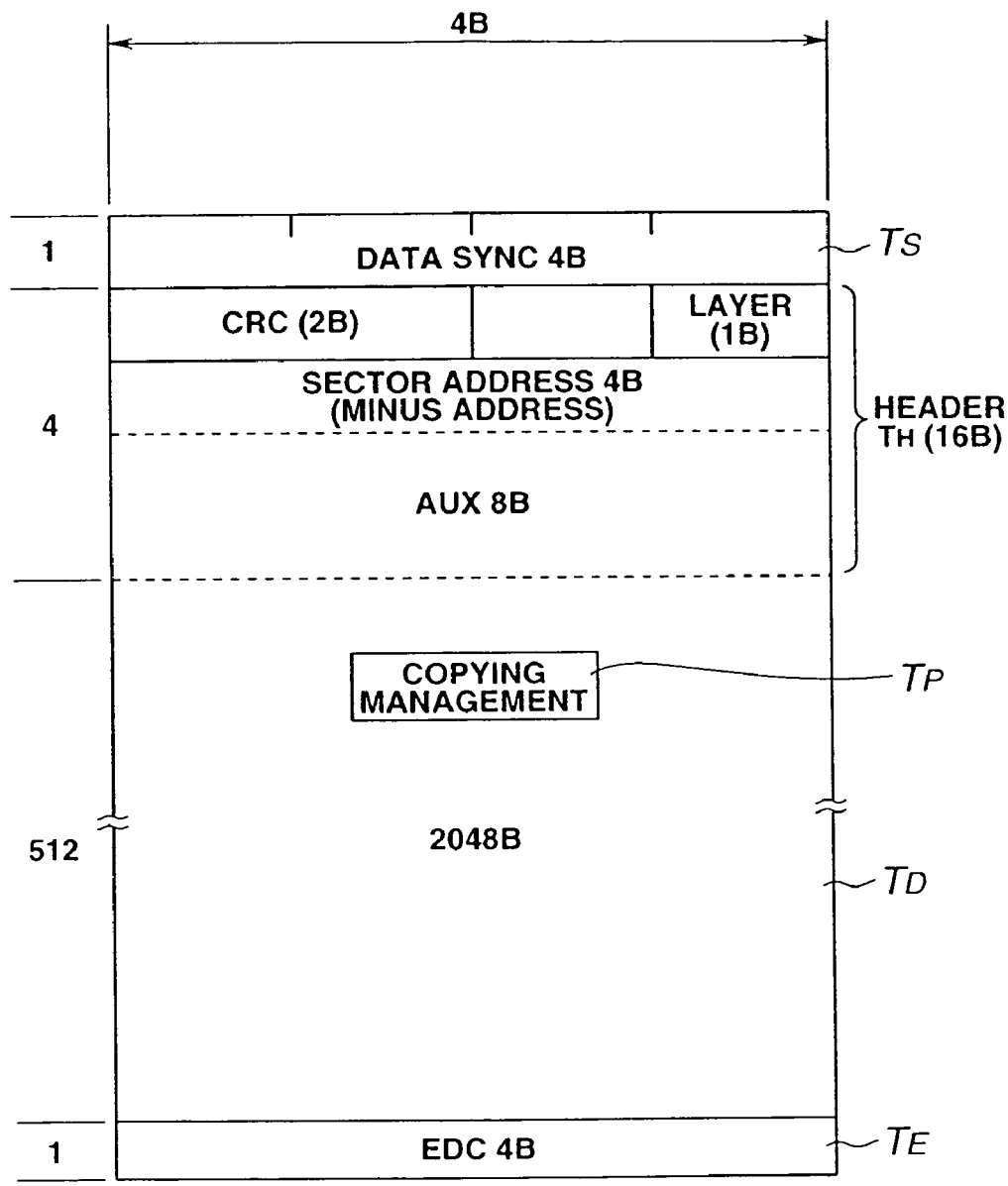
FIG. 6 illustrates the structure of a TOC sector.

Various modifications my be made in the illustrative examples of the copying management information shown in FIG. 2, scrambling circuit shown in FIG. 3 and the sector format shown in FIGS. 5 and 6.

Figure 14:
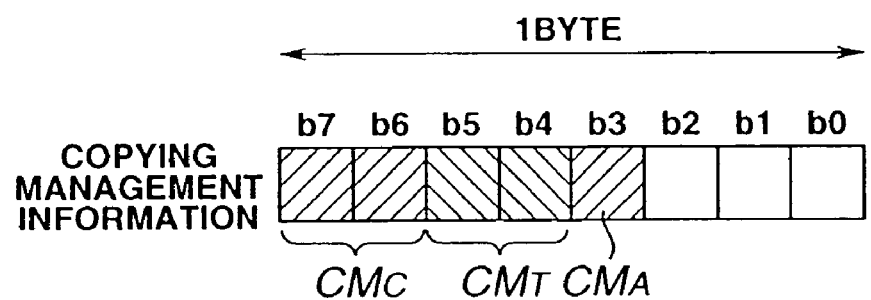
FIG. 14 illustrates another illustrative example of the copy management information.

FIG. 14 shows a modification of the copying management information. Of the eight bits b7 to b0, upper two bits of b7 and b6 are allocated as the information bits $CM_C$ of the copying generation management system (CGMS) for limiting the copying generation, the next two bits b5 and b4 are allocated as trigger bits $CM_T$ of the analog protection system (APS) and the next bit b3 is allocated as the bit $CM_A$ specifying whether or not the source is an analog source. The remaining two bits b2 to b0 are undefined. If the bits (b7, b6) of the information bits $CM_C$ are (0, 0), (1, 0), (1, 1) or (0, 1), these specify copy free, one generation copying possible, copy not permitted and unused, respectively. If the bits (b5, b4) of the APS trigger bits $CM_T$ are (0, 0), (0, 1), (1, 0) or (1, 1), these specify off state, turning the pseudo-sync pulse and a split burst or color stripe as later explained on and off, respectively, turning the PSP and the 2-line split burst on, and turning the PSP and the 4-line split burst on, respectively. If the bit b3 of $CM_A$ is 1 or 0, it specifies an analog package medium and otherwise, respectively.

The contents of the APS trigger bit turning the PSP on means that the analog protect pulse APP shown in FIGS. 10 and 12 be inserted in a pre-set period of the vertical blanking period, such as a period between 12H and 19H. The split burst being on means that the color burst inserted on the trailing side of the horizontal blanking pulse in the horizontal blanking period be partially reversed, while the two-line split burst on means reversing color burst two lines on end every 17 lines. The four-line split burst on means reversing color burst four lines on end every 21 lines. The color burst reversion is an operation of reversing a portion, for example, a forward half portion, of the color burst signal, or changing its phase. Such reversed split color burst produces color interference, such as generation of color stripes, in the copied color video signals.

Figure 15:
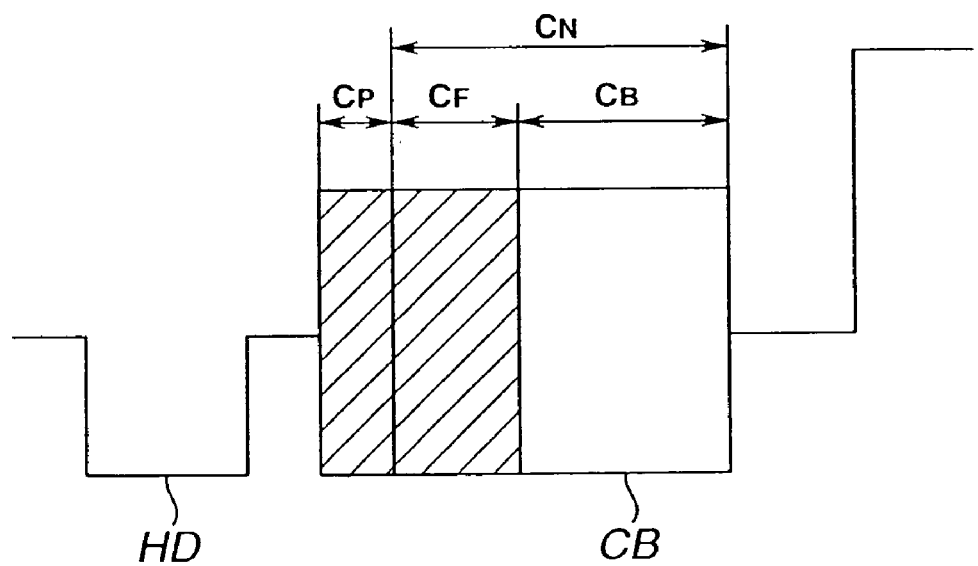
FIG. 15 illustrates a color burst inverting operation.

FIG. 15 illustrates the reversed split color burst APS. In a line in which the color burst is reversed, part of the color burst CB, as a reference signal of the color sub-carrier arrayed on the trailing side of the horizontal synchronization pulse HD, such as a hatched portion in FIG. 15, is reversed in phase. That is, the color burst period $C_N$ in the standard NTSC system is 9 cycles. To the front side of the standard period $C_N$ of the color burst is connected a burst signal of, for example, two cycles, as a pre-period $C_P$, to provide a sum total of 11 cycles. The two cycles of the pre-period $C_P$ and 3.5 cycles of the front period $C_F$ of the former half portion in the color burst standard period $C_N$, totalling at 5.5 cycles, are reversed in burst phase, while 5.5 cycles of the latter back portion $C_B$ in the color burst standard period $C_N$ remain intact.

The color burst signal, partially reversed in phase, is generated in, for example, the protect pulse generating circuit 72 of FIG. 11 or 12 and sent to the mixing circuit 24, where the phase reversed color burst signal is mixed two lines on end every 17 lines for two line split burst on, while being mixed four lines on end every 21 lines for four line split burst on.

As for the split burst operation, part of the color burst is reversed in phase, that is by 180°. However, the color burst phase may also be changed by 90° or 270° or by an optional angle. The period of phase change can be set optionally without being limited to 5.5 cycles.

It is important to note that the Analog Protection System (APS) of the present invention can be implemented apart from the other copy protection features of the invention. A preferred APS for such implementation includes two elements, a "pseudo-sync and AGC pulses" element and a "modified inverted split color burst" element. The AGC element can be used by itself or in conjunction with the modified color burst element.

The AGC element of the APS operates by adding into the vertical blanking interval of an analog video signal (e.g. a 525/60 lines/frames signal) a multiple of bipolar pulse pairs. Each bipolar pulse pair includes a "pseudo-sync" pulse and an "AGC pulse", and the pseudo-sync pulses have an amplitude similar to the level of the video signal's actual sync pulse. Preferably, these bipolar pulses are not inserted in the entire vertical blanking interval of the signal, but rather, are inserted in the vertical blanking interval only for selected lines.

In a preferred embodiment, each pseudo-sync pulse is immediately followed by a positive going AGC pulse having a duration of 3.0 microseconds (+/−a tolerance). The AGC pulses have an amplitude slightly greater than the peak white amplitude of the analog signal. The combination of the pseudo-sync and AGC pulses causes the automatic gain control circuitry in a recording device to record the analog signal at a fraction of the correct level. Accordingly, when an analog video signal containing such bipolar pulses is recorded, any playback of such recorded signal will result in the display of a severely dimmed and/or highly distorted image.

The color burst element of the APS system modifies the color burst portion of selected lines of the analog signal. More specifically, the location and duration of the color burst portions are changed, and the phase of the color burst subcarrier is altered. When an analog signal including the modified color burst signals is recorded, playback of such recorded signal results in display of an image distorted by horizontal bars.

In a preferred AGC element implementation, the bipolar pulses are inserted in lines 10 to 17 and lines 273 to 280 of the vertical blanking interval, the pseudo-sync pulse duration is 2.2 microseconds and the AGC pulse duration is 3.0 microseconds. In a preferred color burst element implementation, the first 3.5 cycles of the regular color burst are inverted and two addition cycles, also inverted relative to the regular color burst, are added to the signal at a point between the horizontal sync pulse and the beginning of the regular color burst. The resulting color burst signal begins immediately after the horizontal sync pulse and is made up of 5.5 cycles of inverted phase color subcarrier followed by 5.5 cycles of normal phase subcarrier.

For 525/60 systems, there are three preferred APS types. In type 1, only pseudo-sync and AGC pulses are used. In type 2, pseudo-sync and AGC pulses in addition to color burst modification are implemented in two successive lines of every 17 lines beginning at line 30 in field 1 and line 301 in field 2. In type 3, as in type 2, pseudo-sync pulses, AGC pulses, and color burst modification are used, however in type 3 the pseudo-sync and AGC pulses and color burst modification are implemented in four successive lines of every 21 lines beginning at line 24 in field 1 and line 297 in field 2.

For 625/50 systems, there is only one preferred APS type. In such systems, pseudo-sync and AGC pulses are inserted at lines 8 to 16 and 320 to 328. Color burst modification is not used.

There are two formats of pseudo-sync/AGC pulse combinations. The pseudo-sync pulse duration is 1.63 or 1.78 microseconds, depending on the line number, and the AGC pulse duration is 2.7 microseconds.

The APS of the present invention can be implemented in combination with the preferred two bit copy management information feature of the invention. In such a combined embodiment, two "trigger bits" are employed to denote the type of copy protection applied to a digital and/or analog signal. The trigger bits indicate whether APS is triggered in addition to the two bit copy management information, and whether the AGC element of APS is triggered independent of or together with the color burst element. In any event, the APS is triggered only when a copyright to the video signal exists and no copying of the video signal is permitted.

In 525/60 systems, the trigger bits are preferably inserted in an analog signal at line 20 of fields 1 and 2 of the vertical blanking interval. More specifically, the trigger bits make up bits 9 and 10 of word 2 in a 20-bit digital signal which is inserted at line 20. In the United States, the trigger bits are alternatively inserted at line 21 of the vertical blanking interval of an analog signal, and they occupy bits $b_2$ and $b_1$ of an XDS packet.

Figure 16:
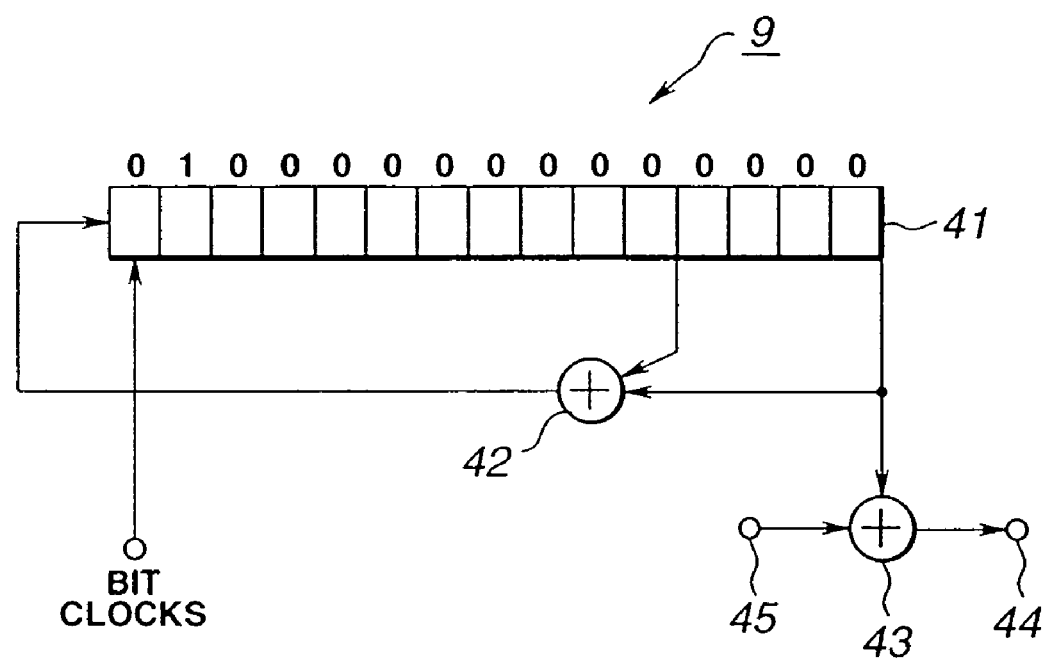
FIG. 16 is a circuit diagram for illustrating another example of the scrambling circuit.

FIG. 16 shows another illustrative example of a scrambling circuit which may be used in place of the above-described scrambling circuit shown in FIG. 3. In the illustrative example of FIG. 16, the 15-bit shift register 41 for scrambling is similar to the illustrative example shown in FIG. 3 except that feedback conforming to the generating polynominal $x^{15}+x^4+1$ is employed, using an exclusive-OR (ExOR) gate 42. Thus the common portions are denoted by the same reference numerals and the corresponding description is omitted for simplicity.

Figure 17:
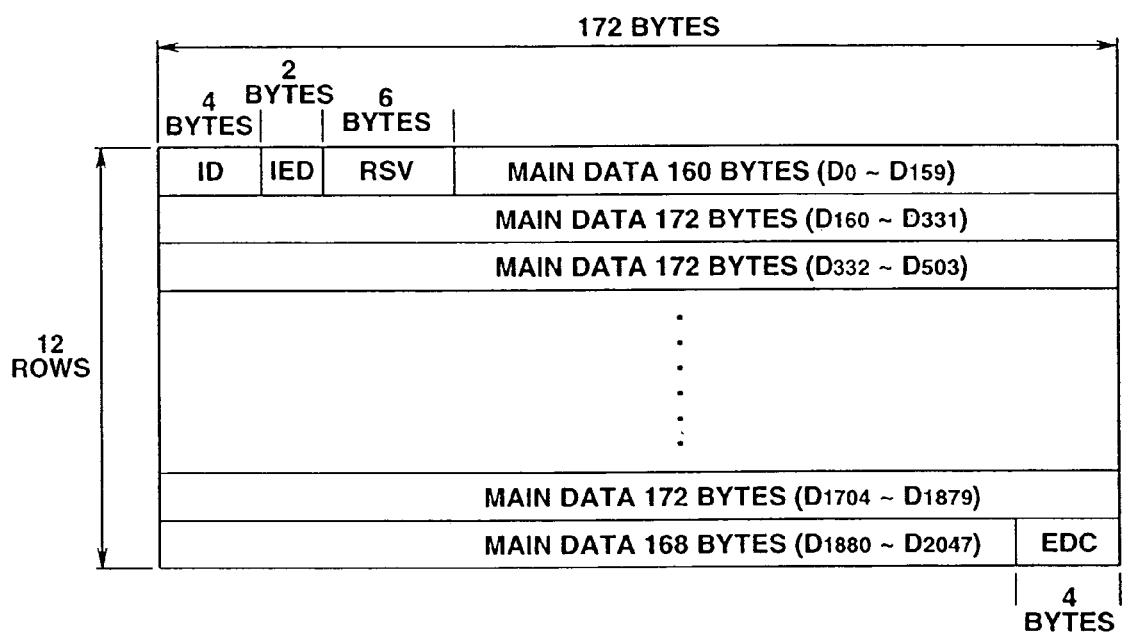
FIG. 17 illustrates another example of a sector format.

In place of the illustrative example of the sector format shown in FIGS. 5 and 6, a sector format shown in FIG. 17 may be used.

In the embodiment of FIG. 17, each sector is made up of 12 rows, each row being made up of 172 bytes, thus totalling at 2064 bytes, of which 2048 bytes represent main data. At the leading position of the first of 12 rows, 4-byte ID (identification data), 2-byte IED (ID error detection code) and a 6-byte RSV (spare) are arrayed in this order. A 4-byte error detection code (EDC) is arrayed at the terminal position of the last row.

Figure 18:
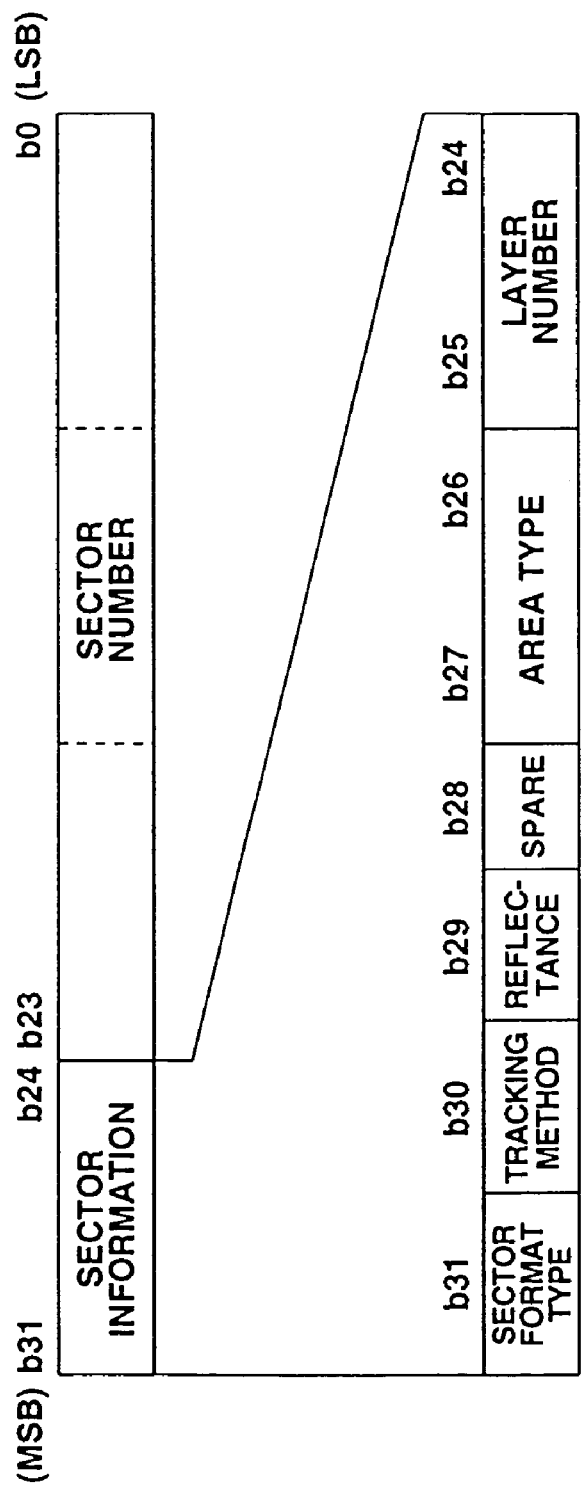
FIG. 18 illustrates another embodiment of a sector header of the sector format of FIG. 17.

Of the 4 bytes of ID (identification data), the first MSB side byte (bits b31 to b24) represent the sector information, with the remaining three bytes (bits b23 to b0) represent the sector numbers, as shown in FIG. 18. The sector information is made up of a 1-bit sector format type, a 1 bit of the tracking method, a 1 bit of reflectance, a 1 bit spare, 2 bits of area types and 2 bits of the layer number, looking from the MSB side.

The copying management information may be provided at a pre-set position in the sector format. For example, in a sector format of the data area, a byte of the 6 bytes of RSV may be used, whereas, in a sector format in the TOC area, several bytes or several tens of bytes of the main data portion may be collected and used as an area for the copying management information.

The above description has been made in connection with recording/reproduction on or from an optical disc or a video tape. For example, if digital data, in which part of the transmission control information similar to the copying management information is transmitted as the key information, is scrambled or ciphered, and the transmission control information is transmitted by being annexed to the ciphered digital data, unauthorized copying can be prevented from occurring. The signal transmission apparatus corresponding to the signal transmission method of the present invention may be similar to the arrangements shown in FIGS. 1, 9, 11 and 13 if the encoder/modulation circuit is changed to a unit performing encoding or modulation conforming to the transmission system and the optical head device or the interfacing means for recording/reproduction is changed to data transmission or data reception means.

In addition, although the ciphering is done solely by scrambling/descrambling in the above-described embodiment, it can also be done by other conversion operations.

On the other hand, although the conversion on the recording side of FIG. 1 is performed by the scrambling circuit 9, it may also be performed in the compression encoding circuit 2 or in the encoder/modulation circuit 6. In such case, the conversion operation on the reproducing side is similarly performed by one of the demodulation circuit 14, error correction circuit 15, sector resolution circuit 16 and the expansion decoding circuit 21, in place of by the descrambling circuit 31. If the conversion operation is performed by one of the demodulation circuit 14, error correction circuit 15, sector resolution circuit 16 and the expansion decoding circuit 21, it is necessary to acquire the information necessary in making decision in the copying management information decision circuit 19 in advance. Since the TOC information is acquired first, the information derived from the TOC information may be employed.

With the above-described arrangement of the present invention, it becomes possible to combat unauthorized copying for the analog copying and digital copying simultaneously.

Although the optical disci and the video tape are used as the signal record medium in the above description, it is also possible to use magnetic recording media, such as so-called IC cards, hard discs or flexible discs, while it is possible to use an optical disc of the type in which recording is done by pits. In addition, a phase change type optical disc, an organic dye type optical disc, an optical disc recorded by UV laser light or optical discs having multi-layer recording films, may be used, in addition to the magneto-optical discs. A variety of tape-shaped recording media, such as video tapes, may also be employed.

Figure 19:
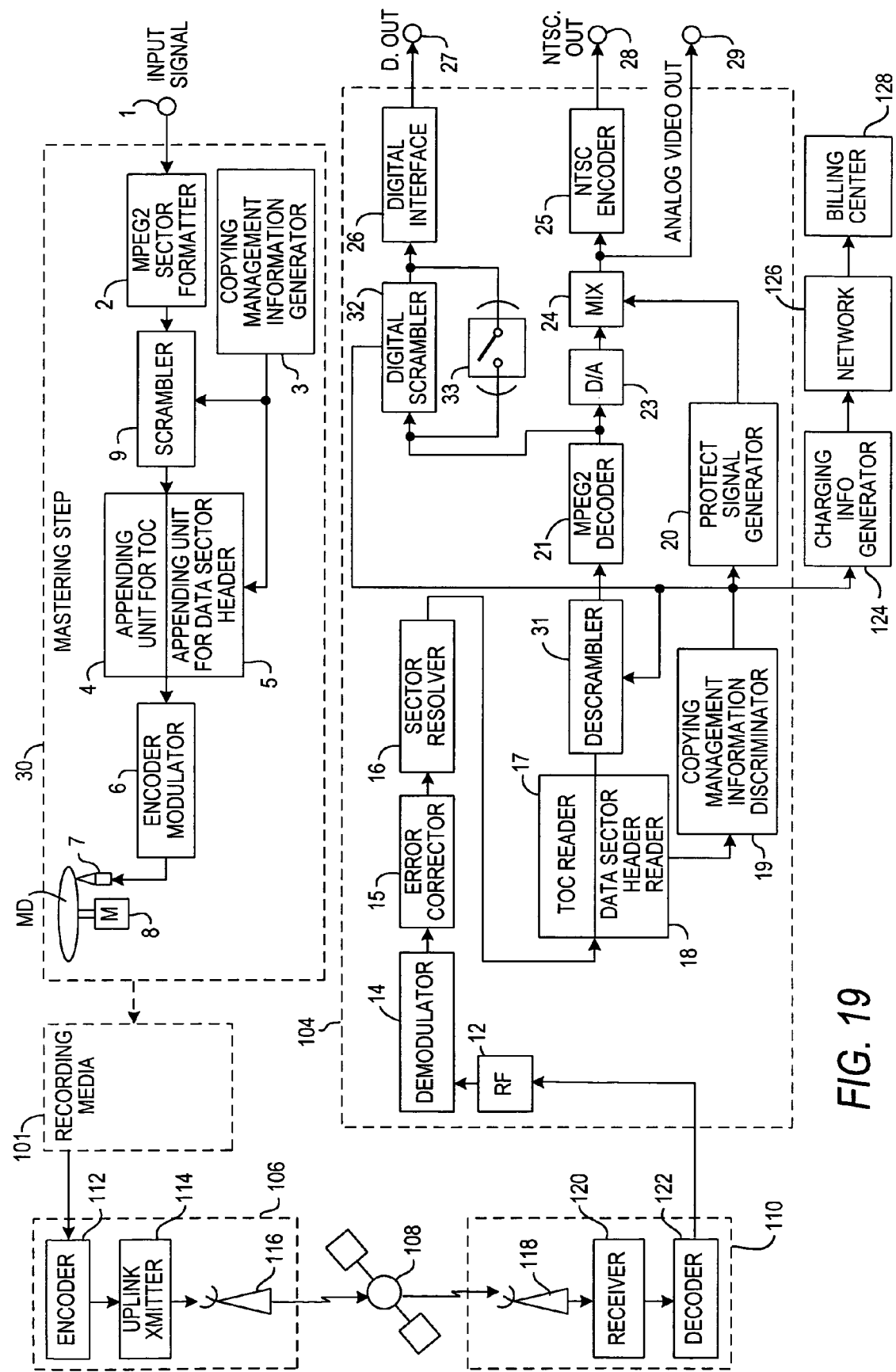
FIG. 19 illustrates an alternative embodiment of the invention featuring replication onto various forms of media, satellite communication and charging implementation.

FIG. 19 shows an embodiment in which a video signal is written to a master disc and the content of the master disc is then replicated on any number of recording media 101 of various types. Furthermore, FIG. 19 shows how the signal stored on media 101 can be transmitted via satellite to a reproducing device 104.

The recording media 101 may include, but are not limited to, Integrated Circuit cards (IC Cards), Hard Disk Drives (HDDs), Magnetic Optical disks (MOs) and various types of Digital Video Disks (e.g., DVD-RAM, DVD-ROM, DVD-R, DVD-RW). A signal recorded on any such medium can be transmitted to a satellite uplink station 106. The uplink station processes the signal for transmission and transmits the processed signal to a satellite 108 which, in turn, transmits the signal to a downlink station 110. The downlink station performs downlink processing on the signal received from the satellite and then transmits the processed received signal to the reproducing device 104.

In FIG. 19, elements previously described in connection with other figures are given their prior reference numbers. Further, in the interest of brevity, a detailed description of such previously described elements will not be provided in connection with FIG. 19.

As can be seen from FIG. 19, data recorded on a master disc (MD) includes processed signal data and copy management information. In addition to the copy management information of FIGS. 2 and 14, the information appended to the input data can include charge information, data content information and/or information related to media 101 or master disc MD.

In any event, the input signal data and appended information is reproduced from the recording media 101 and transmitted to an encoder 112 of satellite uplink station 106. The encoder encodes the data received from the recording medium and passes the encoded data to an uplink transmitter 114. The uplink transmitter converts the encoded data to a suitable carrier frequency and transmits the converted data to satellite 108 via an antenna 116. It is noted that the data received by encoder 112 from recording media 101 may define a multiple of data channels (e.g., multiplexed channels). It is further noted that the encoding performed by encoder 112 may include an error checking/correcting type encoding. It is still further noted that the encoding used for the input signal data may differ from the encoding used for the appended information such that, for example, the encoding used for the appended information has greater error correcting capability than the encoding used for the input data.

The downlink station receives the transmissions from satellite 108 via an antenna 118. The antenna is coupled to a receiver 120 which receives the transmission from the antenna, downconverts the received signal and passes the downconverted signal to a decoder 122. Decoder 122 decodes the downconverted signal and performs error checking/correction. Finally, the decoded signal is passed to reproducing device 104 (e.g. a set top box).

Reproducing device 104 is similar to the reproducing device 50 of FIG. 1. However, reproducing device 104 does not include optical head unit 10, spindle motor 11, or servo circuit 13 for reproducing a signal from an optical disc D. Rather, signals reproduced by device 104 are received directly from the satellite down link station 110 via RF amplifier 12.

The FIG. 19 configuration depicts a charging information generation circuit 124, a network 126 and a billing center 128 for use in implementing a reproduction and/or recording charging scheme. When the information appended to the input signal includes charge information and data content information, such appended information is detected by the copy management information discriminator 19. The discriminator passes the charge and data content information to the charging information circuit. The charging information generation circuit converts the charge and data content information into a form that is suitable for transmission over the network and for use by the billing center. Once converted, the charge and data content information is transmitted to the billing center (e.g. a bank) via the network (e.g., the public telephone network).

The billing center charges a user's account according to the charge information and/or data content information. For instance, the charging information includes a charging rate of dollars and cents per minute of reproduction time, and a user of reproducing device 104 is charged by multiplying the reproduction time and charging rate. Similarly, a user may be using device 104 as part of a recording process, in which case the user is charged by multiplying the recording time and a recording charging rate. In a preferred embodiment, the data content information is used to adjust the charging rate such that the charging rate can be modified according to whether digital video or analog video is being processed. Moreover, the charging rate can be modified according to whether the video signal is compressed and/or according to the level of compression.

Figure 20:
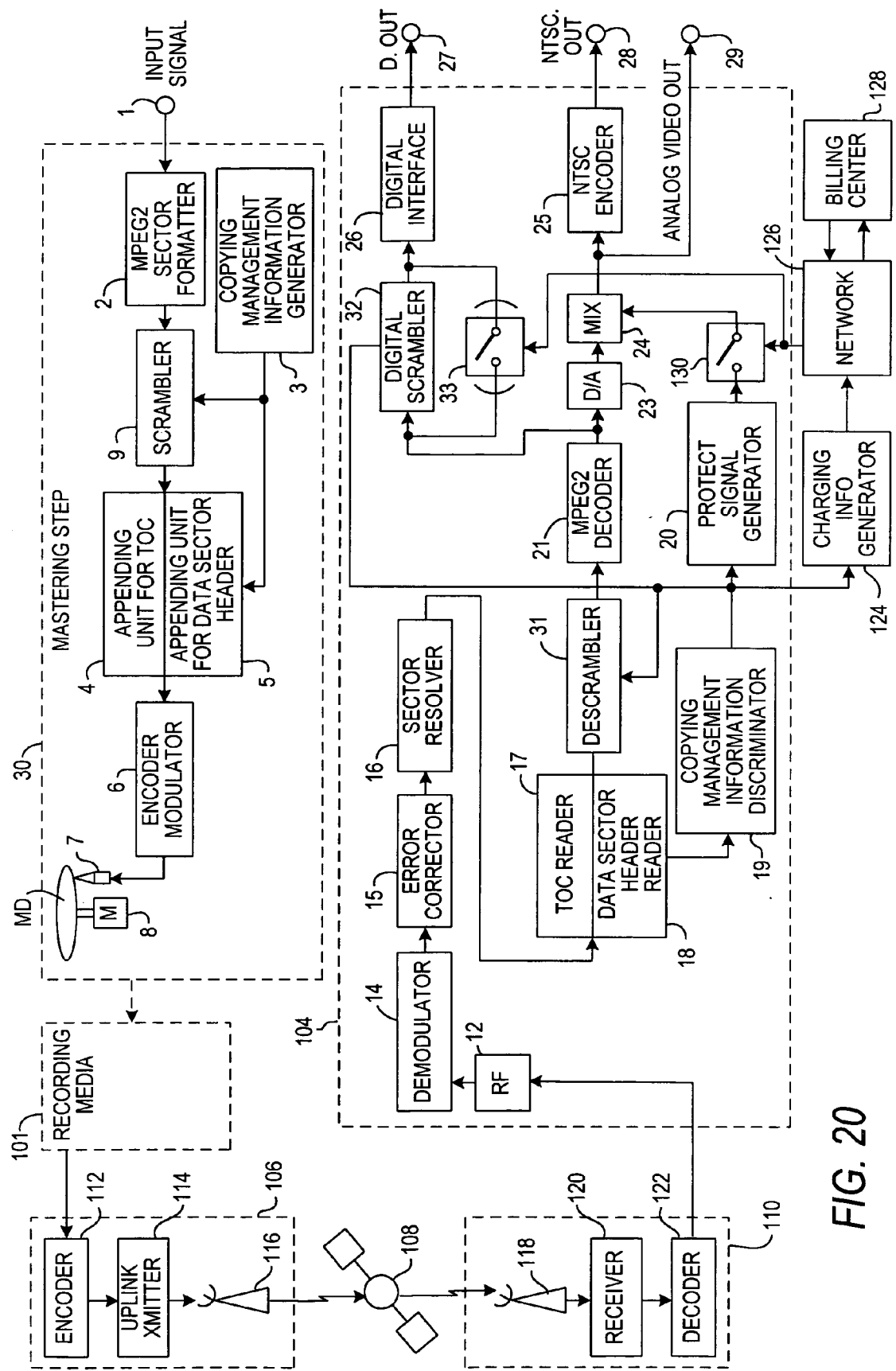
FIG. 20 illustrates an alternative embodiment of the invention wherein copy protection is implemented according to a user's account status.

FIG. 20 illustrates an alternative embodiment of the invention wherein copy protection is implemented according to a user's account status. In the FIG. 20 embodiment, the user's account status is determined from records located at the billing center and is relayed to the network. If the user has supplied sufficient payment, the network overrides the protect signal generator 20 by opening a switch 130 and/or overrides the digital scrambler 32 by closing switch 33. Thereby, allowing multiple copies to be made of the reproduced analog signal output at terminals 28 and 29, and/or allowing multiple copies to be made of the reproduced digital signal output at terminal 27.

In the event that switch 130 is open, multiple copies of the reproduced analog signal are allowed regardless of the status of any copy inhibition indicators included in the copy management information. For example, in the two bit copy management information embodiment, even if the first and second bits are respectively 1,0 (one generation copying allowed) or 1,1 (no copying allowed), multiple copies of the analog signal are still allowed because the analog signal output at terminals 28 and 29 does not contain the analog protect signal.

Similarly, in the event that switch 33 is closed, multiple copies of the reproduced digital signal are allowed regardless of the status of any copy inhibition indicators included in the copy management information because the digital signal output at terminal 27 is not scrambled.

Further, it is noted that the configuration of FIG. 20 is suitable for use in various account dependent implementations of the invention. For instance, a user may be granted or denied the privilege of making multiple analog copies based on whether or not the user has paid a first amount, and the user may be granted or denied the privilege of making multiple digital copies based on whether or not the user has paid a second amount.

At this point it is important to note that one skilled in the art of the present invention could, in light of the detailed descriptions of FIGS. 19 and 20 provided herein, apply the recording media, satellite communications and charging aspects to other embodiments of the invention; notably, the embodiments of FIGS. 7, 9, 11 and 13.

While the present invention has been particularly shown and described in conjunction with preferred embodiments thereof, it will be readily appreciated by those of ordinary skill in the art that various changes may be made without departing from the spirit and scope of the invention. Therefore, it is intended that the appended claims be interpreted as including the embodiments described herein as well as all equivalents thereto.

What is claimed is:

1. A method for providing a copy permission indicator in a video signal, comprising the steps of:

receiving via satellite a video signal with appended copy management information;

detecting said copy management information that has been appended to the video signal;

generating a protect code signal based on said copy management information, said protect code signal having plural coded bits and being operable to indicate a generation limitation on copying of the video signal; and arraying said protect code signal at a pre-set position in the video signal;

whereby said copy management information includes an indicator of whether copying of only digital data is inhibited and copying of both digital data and analog data is inhibited.

2. The method according to claim 1, wherein said protect code signal includes two bits of information, each having distinct significance and together identifying various copy permission states.

3. The method according to claim 2, wherein said two bit protect code signal is indicative of at least three copy permission states: copying is permitted without restriction, one generation of copying is permitted and no copying is permitted.

4. The method according to claim 1, wherein the video signal includes a vertical blanking interval, and wherein said protect code signal is encoded in the vertical blanking interval of the video signal at line 20 of a field.

5. The method according to claim 1, wherein the video signal includes a vertical blanking interval, and wherein said protect code signal is encoded in the vertical blanking interval of the video signal at line 21 of a field.

6. The method according to claim 1, wherein the video signal includes a vertical blanking interval, and wherein said protect code signal includes two bits of information, each having distinct significance and together identifying various copy permission states, said protect code signal is encoded in the vertical blanking interval of the video signal at line 20, and a logical "1" of said protect code signal is represented by a level of about 50-IRE and a logical "0" of said protect code signal is represented by a level of about 0-IRE.

7. The method according to claim 1, wherein the video signal includes a vertical blanking interval, and wherein said protect code signal includes two bits of information, each having distinct significance and together identifying various copy permission states, said protect code signal is encoded in the vertical blanking interval of the video signal at line 21, and a logical "1" of said protect code signal is represented by a level of about 70-IRE and a logical "0" of said protect code signal is represented by a level of about 0-IRE.

8. A method of providing copy protection in a video signal of the type having a vertical blanking interval and having sync pulses, comprising the steps of:
    receiving via satellite a video signal with appended copy management information;
    detecting said copy management information that has been appended to the video signal;
    generating a protection signal based on said copy management information; and
    inserting said protection signal into the video signal by arraying a multiple of pseudo-sync pulses in the vertical blanking interval of the video signal, said pseudo-sync pulses having an amplitude approximately equal to the amplitude of the video signal sync pulses, and arraying a multiple of automatic gain control (AGC) pulses in the vertical blanking interval of the video signal;
    whereby said copy management information includes an indicator of whether copying of only digital data is inhibited and copying of both digital data and analog data is inhibited.

9. The method according to claim 8, wherein the duration of said AGC pulses is approximately 3.0 microseconds.

10. The method according to claim 8, wherein the video signal exhibits a peak white amplitude, and wherein the amplitude of said AGC pulses is approximately slightly greater than the peak white amplitude.

11. The method according to claim 8, wherein said pseudo-sync and AGC pulses are inserted on lines 1 to 17 and 273 to 280 of the vertical blanking interval of the video signal.

12. The method according to claim 8, wherein said pseudo-sync pulses have a duration of approximately 2.2 microseconds.

13. The method according to claim 8, wherein the video signal includes color burst signals of a particular phase, and further comprising the step of modifying the phase of at least a portion of selected color burst signals of the video signal.

14. The method according to claim 13, wherein the steps of arraying said pseudo-sync pulses, arraying said AGC pulses and modifying the phase are performed for two successive lines of every 17 lines of the vertical blanking interval beginning at line 30 in field 1 and at line 301 in field 2.

15. The method according to claim 13, wherein the steps of arraying said pseudo-sync pulses, arraying said AGC pulses and modifying the phase are performed for four successive lines of every 21 lines of the vertical blanking interval beginning at line 24 in field 1 and at line 297 in field 2.

16. A method of providing copy protection in a video signal having a vertical blanking interval, comprising the steps of:
    receiving via satellite a video signal with appended copy management information;
    detecting said copy management information that has been appended to the video signal in the form of a multiple of trigger bits in the video signal; and
    arraying a multiple of pseudo-sync pulses and a multiple of automatic gain control pulses in the video signal when said trigger bits indicate that copying should be inhibited;
    whereby said copy management information includes an indicator of whether copying of only digital data is inhibited and copying of both digital data and analog data is inhibited.

17. The method according to claim 16, wherein the video signal includes color burst signals of a particular phase, and further comprising the step of modifying the phase of at least a portion of selected color burst signals of the video signal when said trigger bits indicate that color burst modification should be performed.

18. The method according to claim 16, wherein said trigger bits are only operable when copyright subsists in the video signal.

19. The method according to claim 16, wherein said trigger bits are encoded in the vertical blanking interval of the video signal at line 20 of field 1 and line 20 of field 2.

20. The method according to claim 19, wherein said trigger bits are bits 9 and 10 of word 2 in a 20 bit digital signal.

21. An apparatus for providing a copy permission indicator in a video signal, comprising:
    means for receiving via satellite a video signal with appended copy management information;
    means for detecting said copy management information that has been appended to the video signal;
    means for generating a protect code signal based on said copy management information, said protect code signal having plural coded bits and being operable to indicate a generation limitation on copying of the video signal; and
    means for arraying said protect code signal at a pre-set position in the video signal;

whereby said copy management information includes an indicator of whether copying of only digital data is inhibited and copying of both digital data and analog data is inhibited.

22. The apparatus according to claim 21, wherein said protect code signal includes two bits of information, each having distinct significance and together identifying various copy permission states.

23. The apparatus according to claim 22, wherein said two bit protect code signal is indicative of at least three copy permission states: copying is permitted without restriction, one generation of copying is permitted and no copying is permitted.

24. The apparatus according to claim 21, wherein the video signal includes a vertical blanking interval, and wherein said protect code signal is encoded in the vertical blanking interval of the video signal at line 20 of a field.

25. The apparatus according to claim 21, wherein the video signal includes a vertical blanking interval, and wherein said protect code signal is encoded in the vertical blanking interval of the video signal at line 21 of a field.

26. The apparatus according to claim 21, wherein the video signal includes a vertical blanking interval, and wherein said protect code signal includes two bits of information, each having distinct significance and together identifying various copy permission states, said protect code signal is encoded in the vertical blanking interval of the video signal at line 20, and a logical "1" of said protect code signal is represented by a level of about 50-IRE and a logical "0" of said protect code signal is represented by a level of about 0-IRE.

27. The apparatus according to claim 21, wherein the video signal includes a vertical blanking interval, and wherein said protect code signal includes two bits of information, each having distinct significance and together identifying various copy permission states, said protect code signal is encoded in the vertical blanking interval of the video signal at line 21, and a logical "1" of said protect code signal is represented by a level of about 70-IRE and a logical "0" of said protect code signal is represented by a level of about 0-IRE.

28. An apparatus for providing copy protection in a video signal of the type having a vertical blanking interval and having sync pulses, comprising:
  means for receiving via satellite a video signal with appended copy management information;
  means for detecting said copy management information that has been appended to the video signal;
  means for generating a protection signal based on said copy management information; and
  means for inserting said protection signal into the video signal by arraying a multiple of pseudo-sync pulses in the vertical blanking interval of the video signal, said pseudo-sync pulses having an amplitude approximately equal to the amplitude of the video signal sync pulses, and arraying a multiple of automatic gain control (AGC) pulses in the vertical blanking interval of the video signal;
  whereby said copy management information includes an indicator of whether copying of only digital data is inhibited and copying of both digital data and analog data is inhibited.

29. The apparatus according to claim 28, wherein the duration of said AGC pulses is approximately 3.0 microseconds.

30. The apparatus according to claim 28, wherein the video signal exhibits a peak white amplitude, and wherein the amplitude of said AGC pulses is approximately slightly greater than the peak white amplitude.

31. The apparatus according to claim 28, wherein said pseudo-sync and AGC pulses are inserted on lines 1 to 17 and 273 to 280 of the vertical blanking interval of the video signal.

32. The apparatus according to claim 28, wherein said pseudo-sync pulses have a duration of approximately 2.2 microseconds.

33. The apparatus according to claim 28, wherein the video signal includes color burst signals of a particular phase, and further comprising means for modifying the phase of at least a portion of selected color burst signals of the video signal.

34. The apparatus according to claim 33, wherein the operations of arraying said pseudo-sync pulses, arraying said AGC pulses and modifying the phase are performed for two successive lines of every 17 lines of the vertical blanking interval beginning at line 30 in field 1 and at line 301 in field 2.

35. The apparatus according to claim 33, wherein the operations of arraying said pseudo-sync pulses, arraying said AGC pulses and modifying the phase are performed for four successive lines of every 21 lines of the vertical blanking interval beginning at line 24 in field 1 and at line 297 in field 2.

36. An apparatus for providing copy protection in a video signal having a vertical blanking interval, comprising:
  means for receiving via satellite a video signal with appended copy management information;
  means for detecting said copy management information that has been appended to the video signal in the form of a multiple of trigger bits in the video signal; and
  means for arraying a multiple of pseudo-sync pulses and a multiple of automatic gain control pulses in the video signal when said trigger bits indicate that copying should be inhibited;
  whereby said copy management information includes an indicator of whether copying of only digital data is inhibited and copying of both digital data and analog data is inhibited.

37. The apparatus according to claim 36, wherein the video signal includes color burst signals of a particular phase, and further comprising means for modifying the phase of at least a portion of selected color burst signals of the video signal when said trigger bits indicate that color burst modification should be performed.

38. The apparatus according to claim 36, wherein said trigger bits are only operable when copyright subsists in the video signal.

39. The apparatus according to claim 36, wherein said trigger bits are encoded in the vertical blanking interval of the video signal at line 20 of field 1 and line 20 of field 2.

40. The apparatus according to claim 39, wherein said trigger bits are bits 9 and 10 of word 2 in a 20 bit digital signal.

* * * * *